(12) United States Patent
Seo et al.

(10) Patent No.: US 10,430,004 B2
(45) Date of Patent: Oct. 1, 2019

(54) TOUCH SENSOR AND METHOD FOR MANUFACTURING SAME

(71) Applicant: LG CHEM, LTD., Seoul (KR)

(72) Inventors: Han Min Seo, Daejeon (KR); Ji Young Hwang, Daejeon (KR); Seung Heon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/580,647

(22) PCT Filed: Jun. 14, 2016

(86) PCT No.: PCT/KR2016/006307
§ 371 (c)(1),
(2) Date: Dec. 7, 2017

(87) PCT Pub. No.: WO2016/204488
PCT Pub. Date: Dec. 22, 2016

(65) Prior Publication Data
US 2018/0164916 A1   Jun. 14, 2018

(30) Foreign Application Priority Data

Jun. 14, 2015  (KR) .................. 10-2015-0083804

(51) Int. Cl.
*G06F 3/044* (2006.01)
(52) U.S. Cl.
CPC .... *G06F 3/044* (2013.01); *G06F 2203/04103* (2013.01); *G06F 2203/04104* (2013.01); *G06F 2203/04107* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS

| | | |
|---|---|---|
| 2012/0205764 A1 | 8/2012 | Chen et al. |
| 2012/0256642 A1 | 10/2012 | Badaye et al. |
| 2013/0081869 A1 | 4/2013 | Kim et al. |
| 2013/0106780 A1 | 5/2013 | Hotelling et al. |
| 2013/0127775 A1 | 5/2013 | Yilmaz et al. |
| 2013/0176238 A1 | 7/2013 | Lo et al. |
| 2014/0043257 A1* | 2/2014 | Lee .................. G06F 3/041 345/173 |
| 2014/0232682 A1 | 8/2014 | Kim |
| 2014/0300578 A1 | 10/2014 | Hotelling |

(Continued)

FOREIGN PATENT DOCUMENTS

JP   2010-286886   12/2010
JP     201456461    3/2014
(Continued)

*Primary Examiner* — Gustavo Polo
(74) *Attorney, Agent, or Firm* — Dentons US LLP

(57) ABSTRACT

The present application relates to a touch sensor and a method of manufacturing the same, and the touch sensor according to the present application includes: a substrate; and a driving electrode unit, a sensing electrode unit, and a wiring electrode unit provided on the same surface of the substrate, in which each of the driving electrode unit, the sensing electrode unit, and the wiring electrode unit includes a conductive pattern including a shielding portion and an opening portion.

19 Claims, 16 Drawing Sheets

(56) References Cited

U.S. PATENT DOCUMENTS

2015/0092359 A1     4/2015   Kim et al.
2015/0324024 A1   11/2015   Hwang et al.
2016/0274727 A1     9/2016   Nakamura

FOREIGN PATENT DOCUMENTS

| | | |
|---|---|---|
| JP | 2014170342 | 9/2014 |
| JP | 201595168 | 5/2015 |
| JP | 2015106240 | 6/2015 |
| KR | 10-1299847 | 8/2013 |
| KR | 10-1461341 | 11/2014 |
| KR | 10-2015-0005688 | 1/2015 |
| KR | 10-1506512 | 3/2015 |
| KR | 10-2015-0036903 | 4/2015 |

* cited by examiner

[Figure 1]
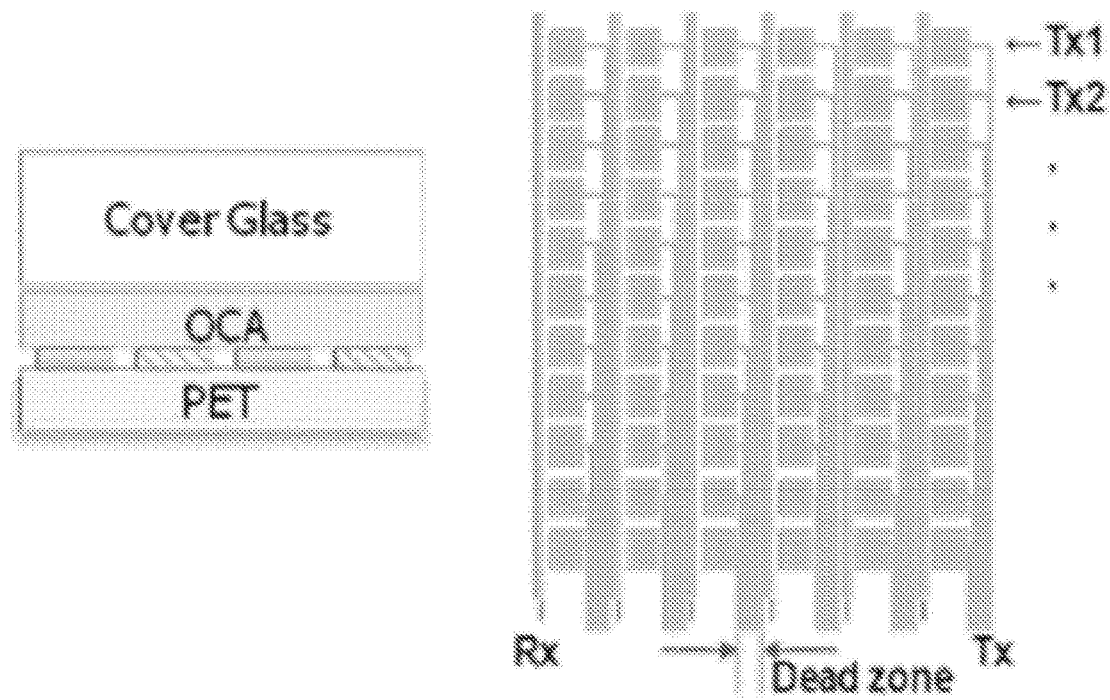

[Figure 2]
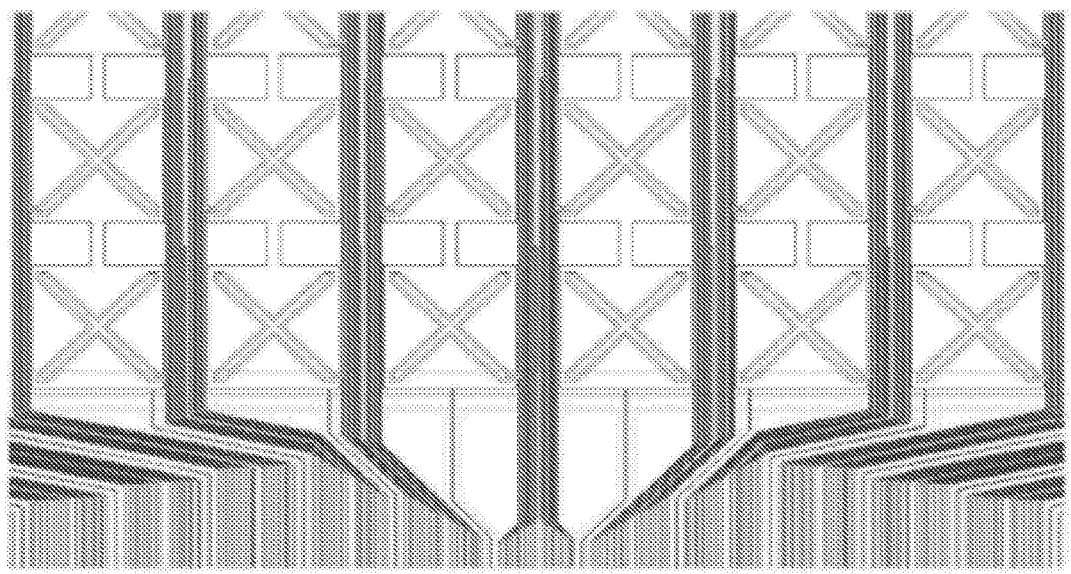

[Figure 3]
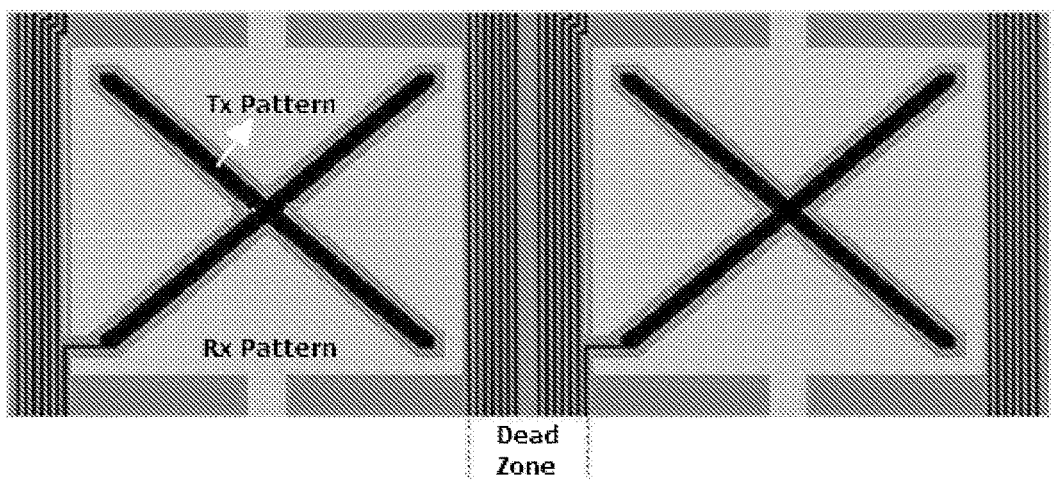

[Figure 4]
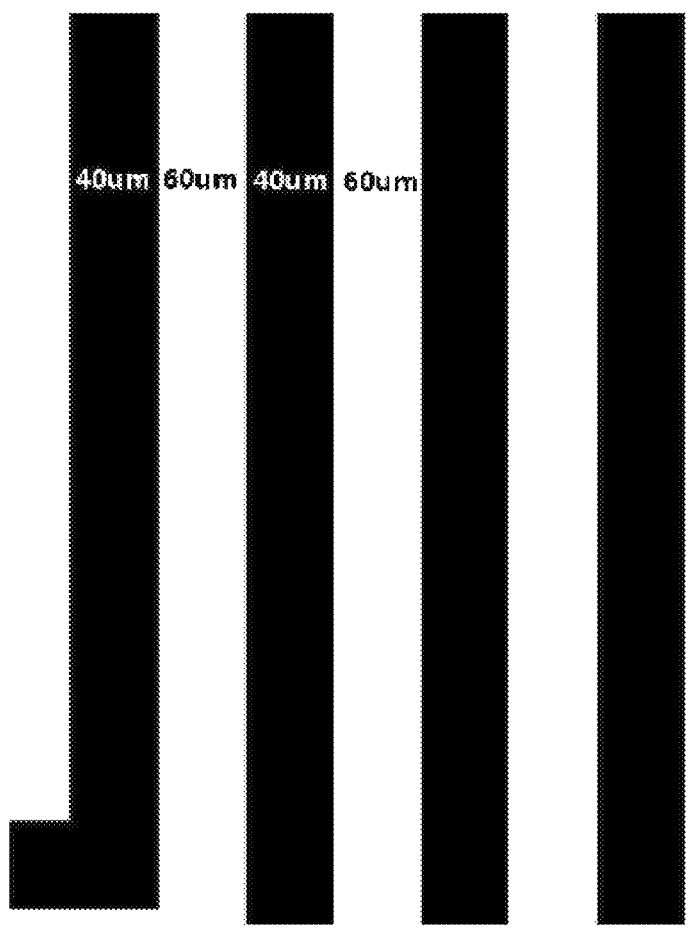

[Figure 5]
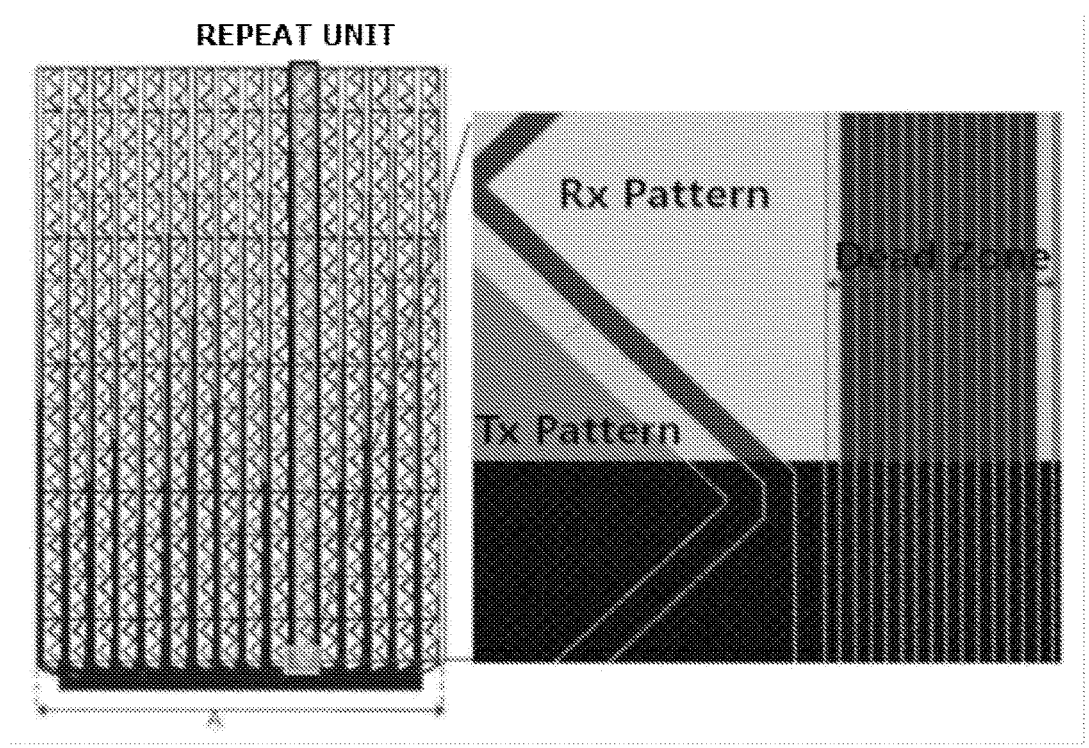

[Figure 6]
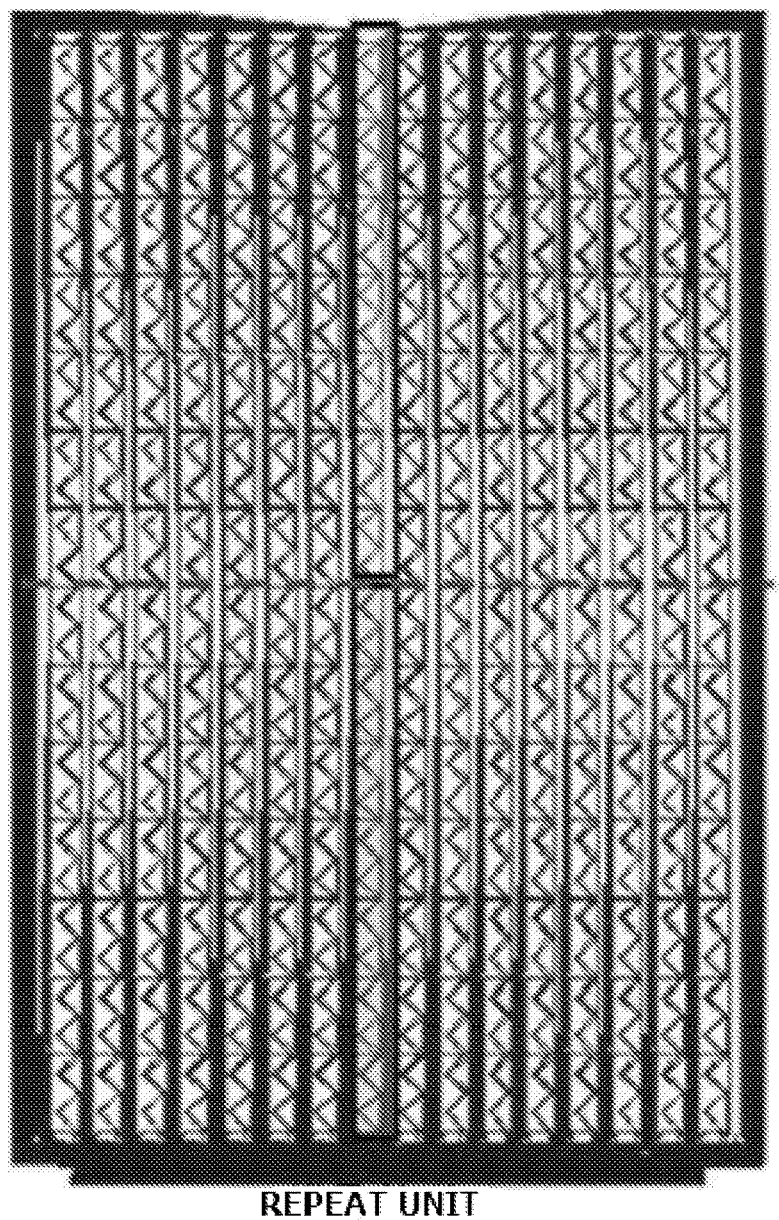
REPEAT UNIT

[Figure 7]
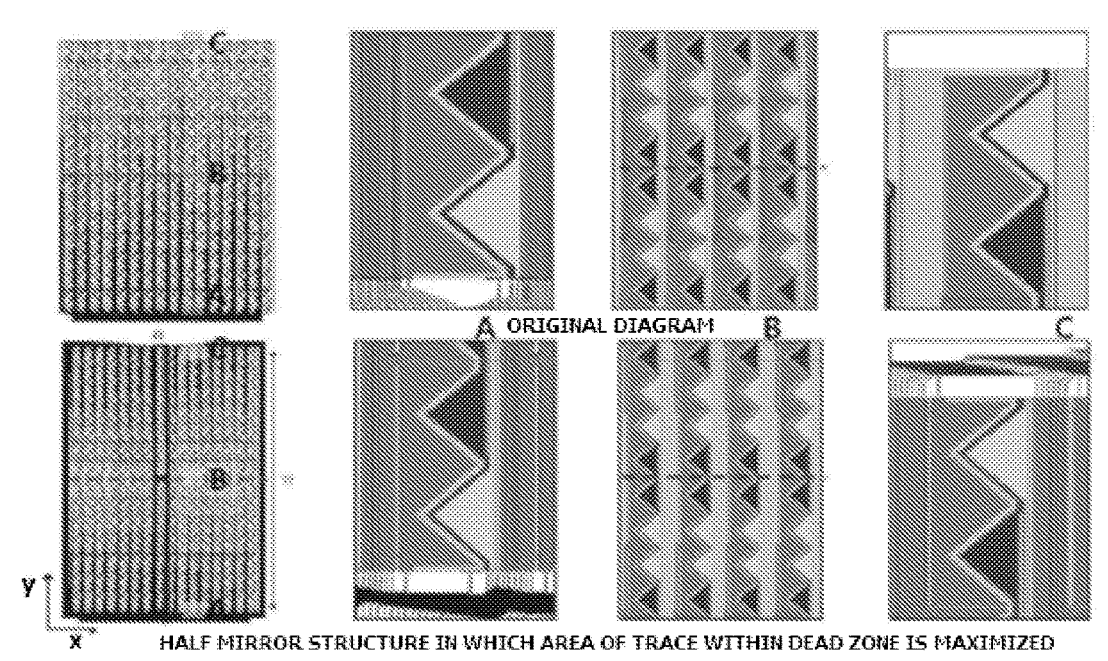

[Figure 8]
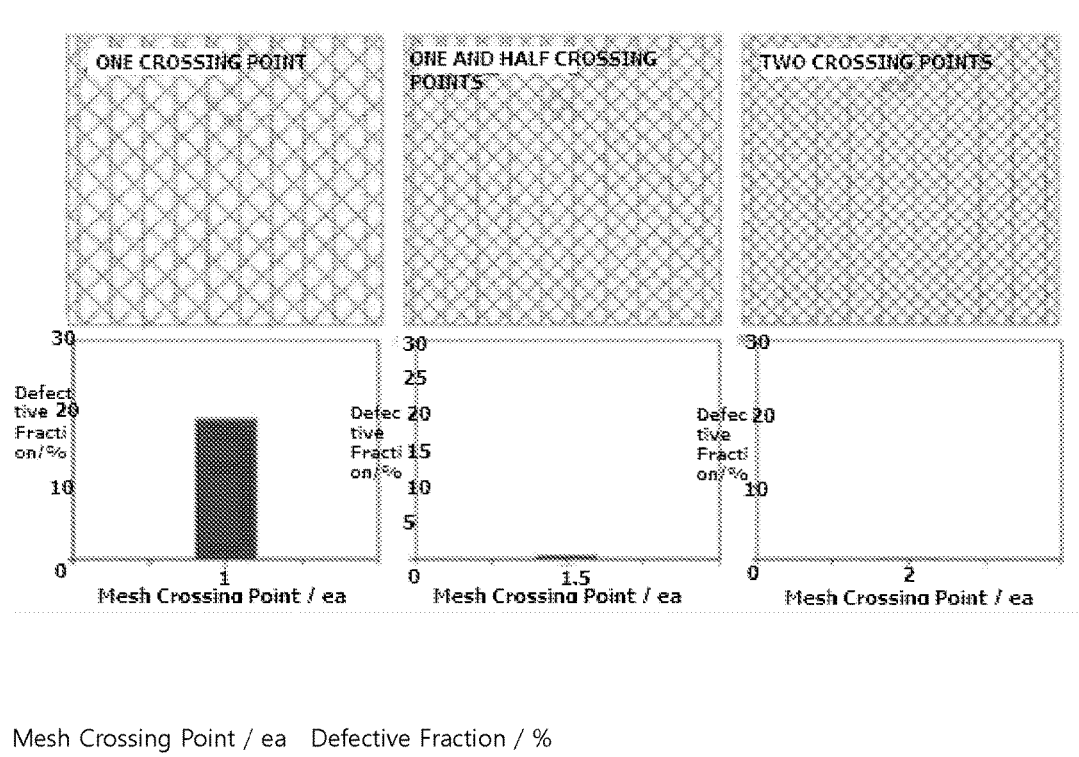
Mesh Crossing Point / ea   Defective Fraction / %

[Figure 9]
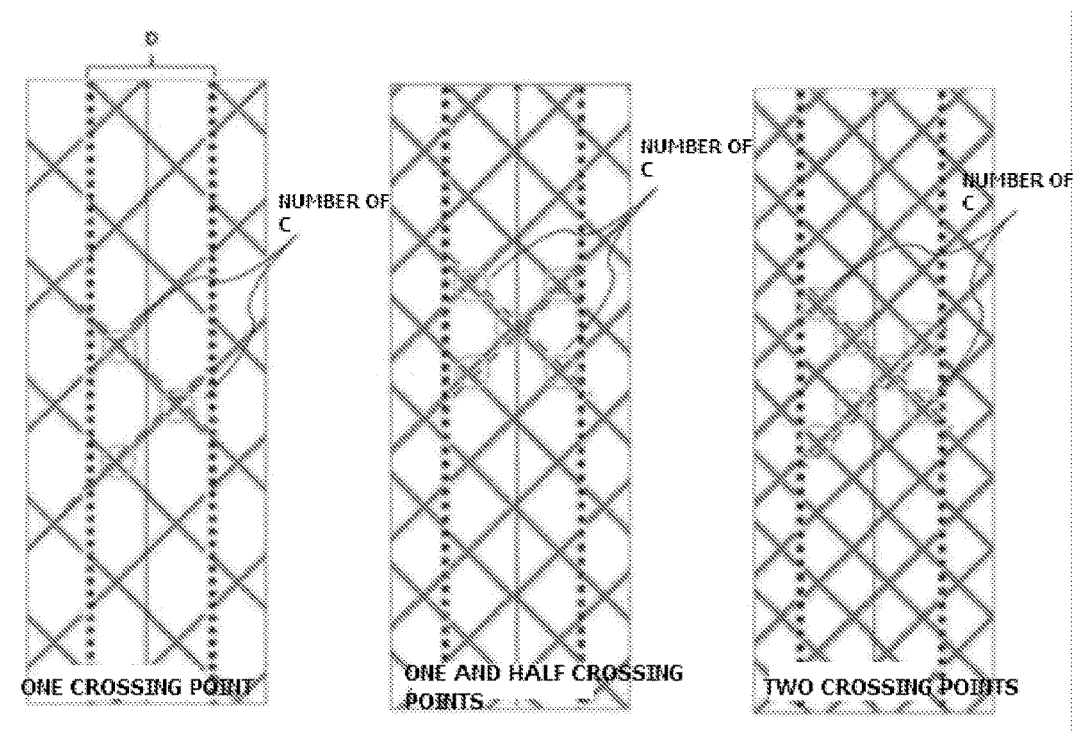

[Figure 10]
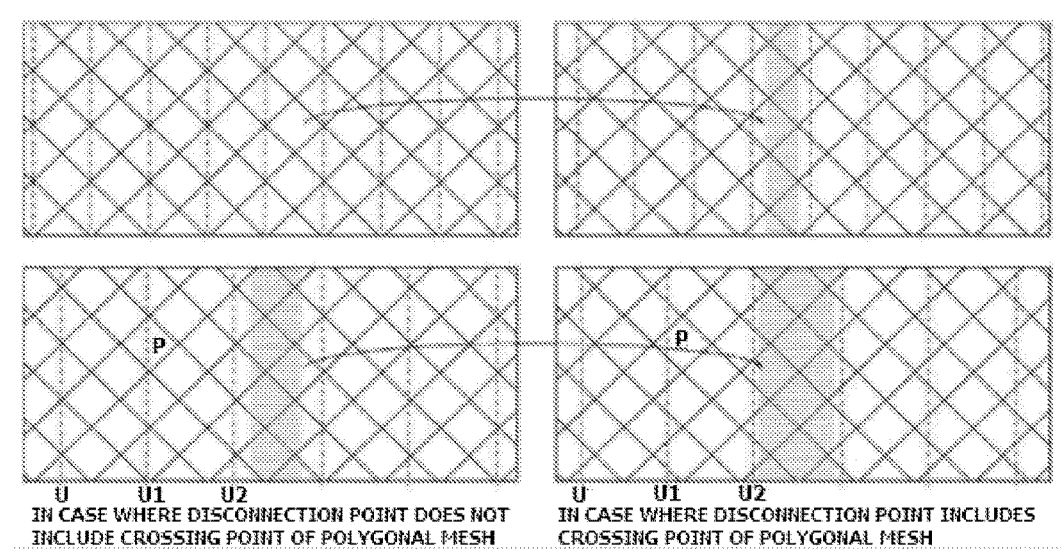

[Figure 11]
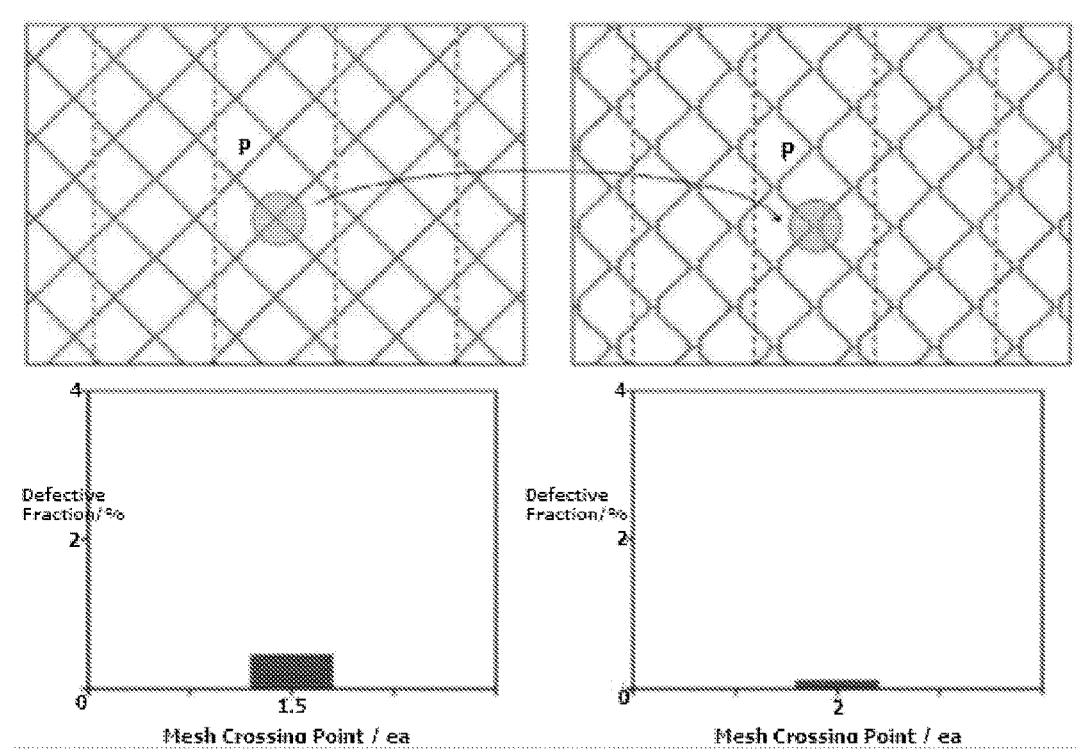

[Figure 12]
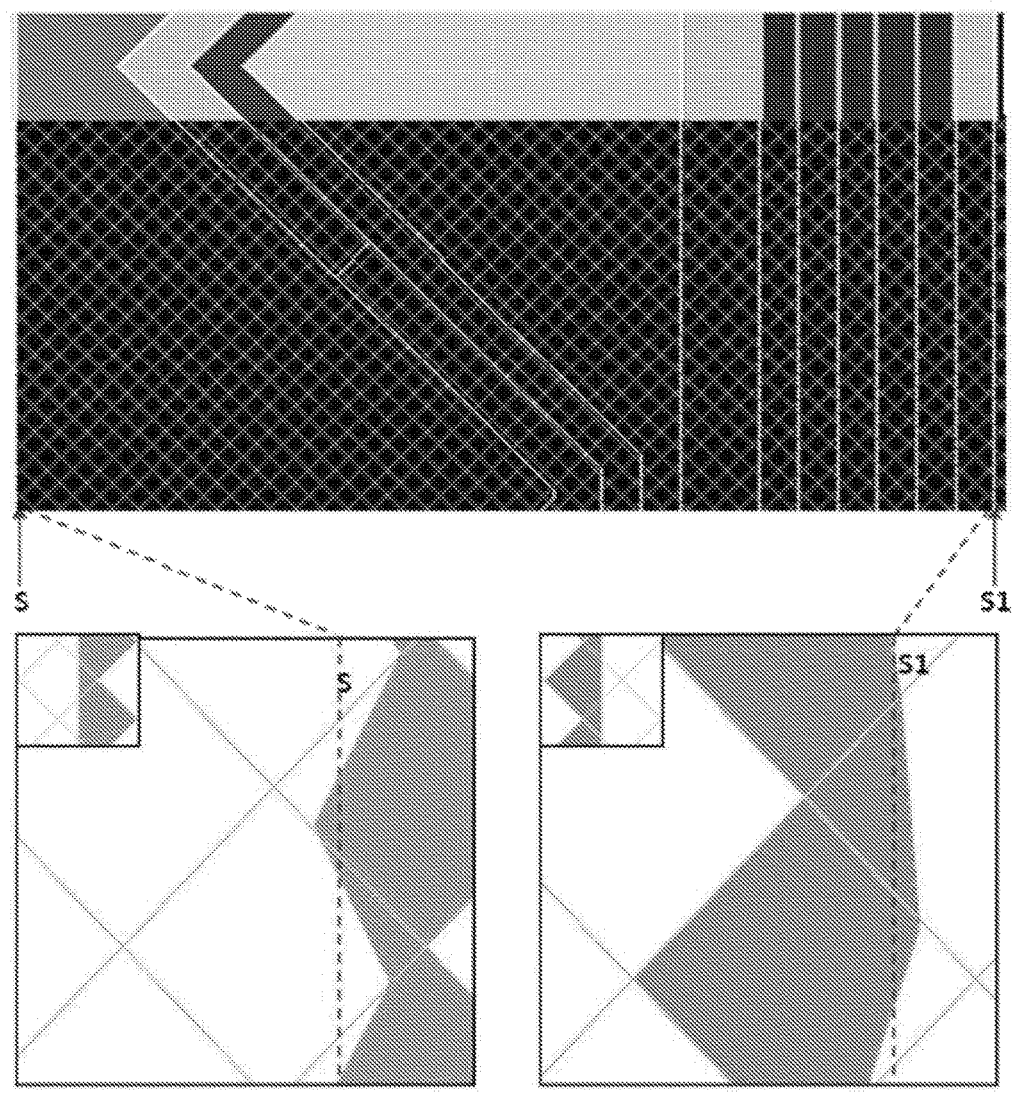

[Figure 13]
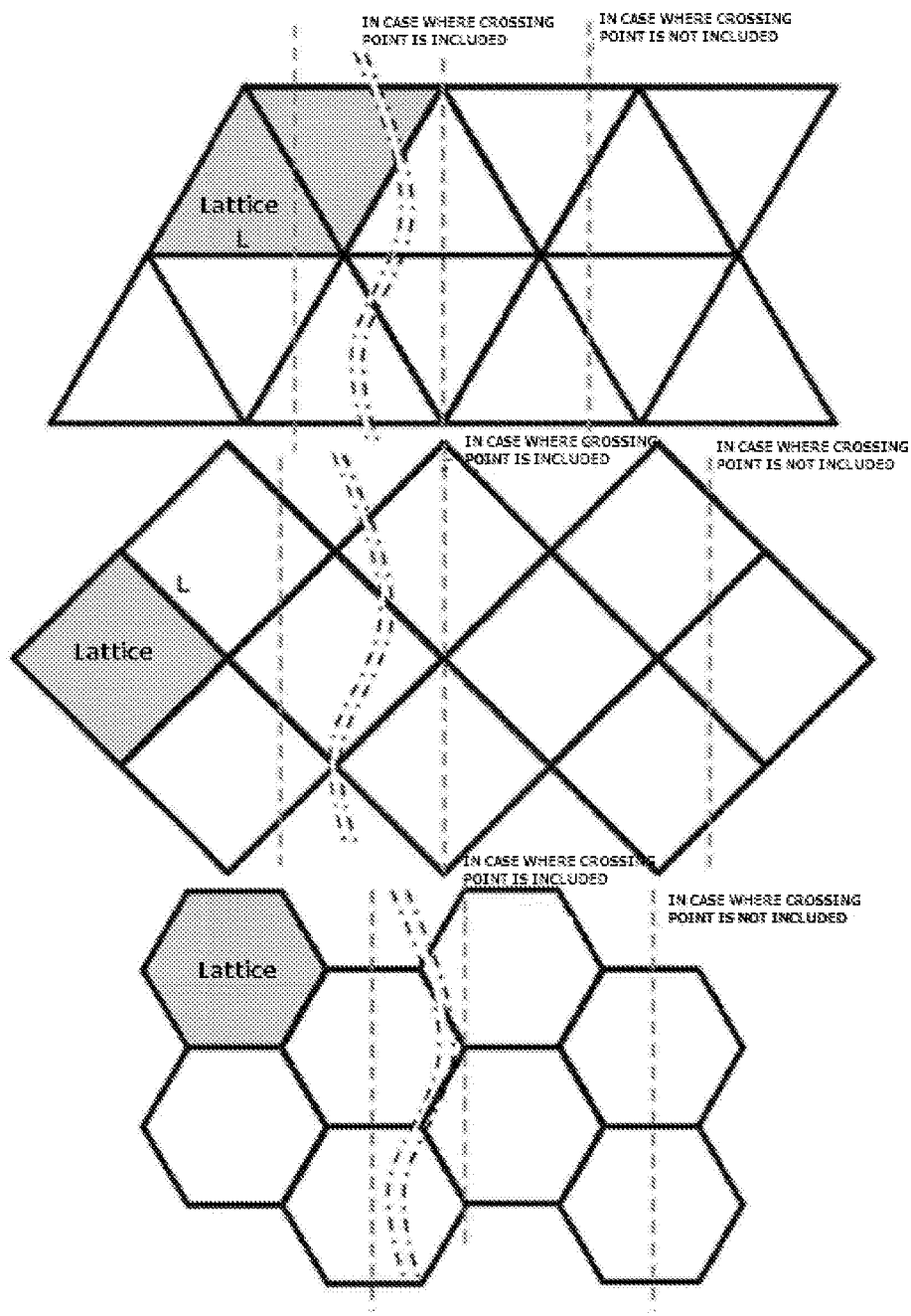

[Figure 14]
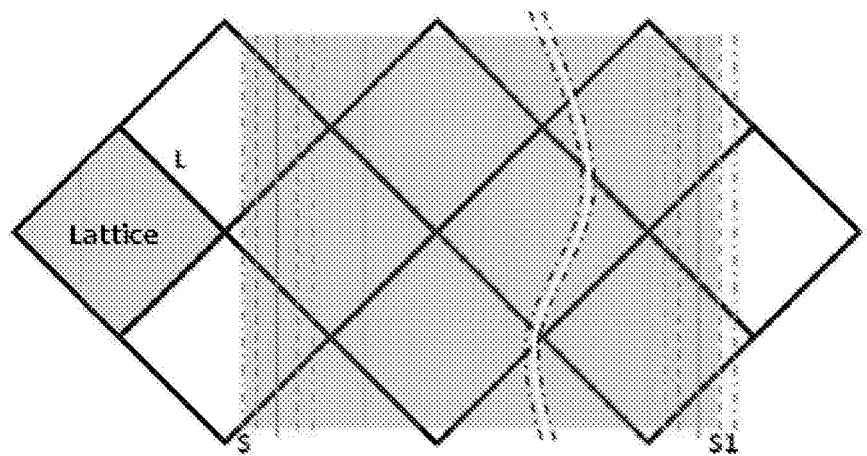
[IN CASE WHERE POSITIONS OF DISCONNECTION POINTS WITHIN LATTICES OF S AND S1 DO NOT CORRESPOND]
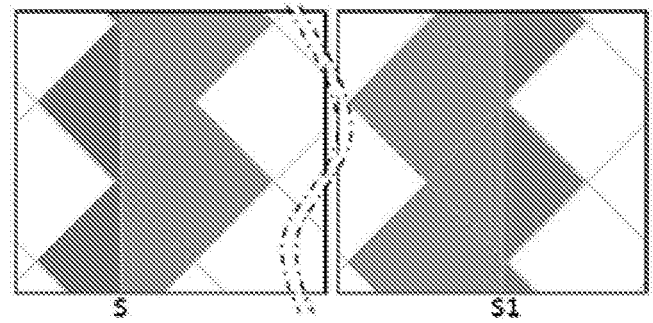

[Figure 15]
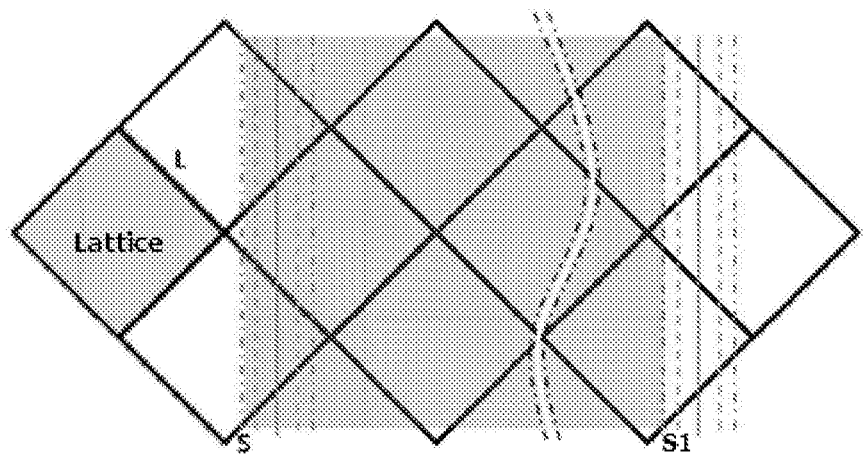
[IN CASE WHERE POSITIONS OF DISCONNECTION POINTS WITHIN LATTICES OF S AND S1 CORRESPOND]
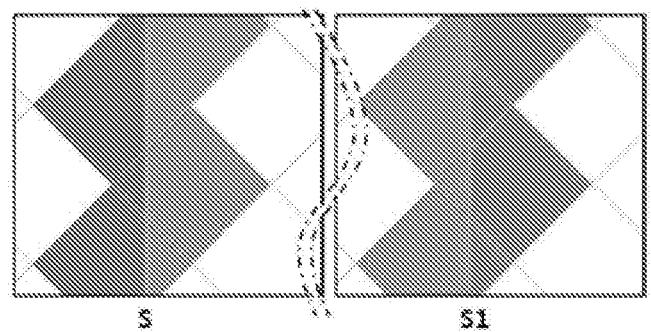

[Figure 16]
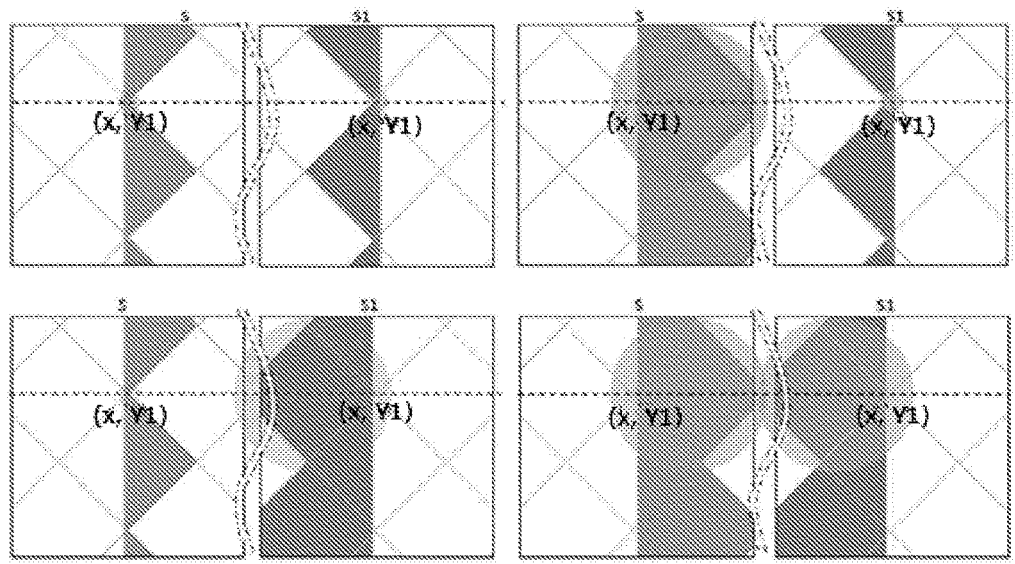

TOUCH SENSOR AND METHOD FOR MANUFACTURING SAME

This application is a National Stage Application of International Application No. PCT/KR2016/006307 filed on Jun. 14, 2016, which claims priority to and the benefit of Korean Patent Application No. 10-2015-0083804 filed in the Korean Intellectual Property Office on Jun. 14, 2015, both of which are incorporated herein in their entirety by reference for all purposes as if fully set forth herein.

TECHNICAL FIELD

This application claims priority to and the benefit of Korean Patent Application No. 10-2015-0083804 filed in the Korean Intellectual Property Office on Jun. 14, 2015, the entire contents of which are incorporated herein by reference.

The present application relates to a touch sensor and a method of manufacturing the same.

BACKGROUND ART

In general, a display device refers to monitors for a TV or a computer as a whole, and includes a display element forming an image and a case supporting the display element.

Examples of the display element may include a plasma display panel (PDP), a liquid crystal display (LCD), an electrophoretic display, and a cathode-ray tube (CRT). The display element may include an RGB pixel pattern and an additional optical filter for implementing an image.

The optical filter may include at least one of a reflection prevention film preventing the external light that is incident from the outside from being reflected to the outside again, a near IR shielding film shielding the near IR generated in the display element in order to prevent a mis-operation of electronic devices such as remote controllers, a color correction film increasing the color purity by controlling a color tone by including a color control dye, and an electromagnetic wave shielding film that shields the electromagnetic wave generated in a display element when a display apparatus is driven. Here, the electromagnetic wave shielding film includes a transparent substrate and a metal mesh pattern provided on the substrate.

Meanwhile, with regard to the display apparatus, as the distribution of IPTVs is accelerated, a demand for a touch function that uses hands as a direct input apparatus without a separate input apparatus such as remote controllers is growing. Further, a multi-touch function that is capable of recognizing a specific point and writing is also required.

The touch sensor performing the aforementioned function may be classified into the following types according to a signal detection manner.

That is, the touch sensor includes a resistive type, in which a position pressed by pressure in a state where a direct-current voltage is applied is sensed based on a change in a current or voltage value, a capacitive type using capacitance coupling in a state where an alternating-current voltage is applied, an electromagnetic type, in which a selected position is sensed based on a change in a voltage in a state where a magnetic field is applied, and the like.

Among them, the resistive type and capacitive type touch sensors that are most extensively spread recognize a touch by a change in an electric contact or capacitance by using a transparent conductive film, such as an ITO film. However, since the transparent conductive film has high resistance of 100 ohm/square or more, sensitivity is degraded when the transparent conductive film is manufactured in a large scale, and as the size of screen is increased, the cost of the ITO film is rapidly increased, so that it is not easy to commercialize the touch sensor. In order to overcome the problem, there is an effort to implement a transparent conductive film by using a metal pattern having high conductivity.

DETAILED DESCRIPTION OF THE INVENTION

Technical Problem

The present application aims to improve a manufacturing process of a touch sensor to decrease manufacturing cost of the touch sensor, and improve lightness and thinness of the touch sensor.

Technical Solution

An exemplary embodiment of the present application provides a touch sensor, including: a substrate; and a driving electrode unit, a sensing electrode unit, and a wiring electrode unit provided on the same surface of the substrate, in which the touch sensor includes a touch sensing region and a touch non-sensing region, each of the driving electrode unit, the sensing electrode unit, and the wiring electrode unit includes a conductive pattern including a shielding portion and an opening portion, the wiring electrode unit includes a first wiring electrode unit positioned in the touch sensing region of the touch sensor and a second wiring electrode unit positioned in the touch non-sensing region of the touch sensor, and the first wiring electrode unit includes one or two or more bundles of wires connecting the driving electrode unit or the sensing electrode unit to the second wiring electrode unit, the conductive pattern configuring the touch sensing region includes a form, in which n repeat unit patterns are repeated in a width direction of the touch sensing region, and the second wiring electrode unit is provided in a touch non-sensing region provided to be adjacent to a lateral surface of an upper portion of the touch sensing region and a touch non-sensing region provided to be adjacent to a lateral surface of a lower portion of the touch sensing region.

Another exemplary embodiment of the present application provides a display apparatus including the touch sensor.

Advantageous Effects

According to the exemplary embodiment of the present application, it is possible to provide the touch sensor in a single surface one-sheet type, so that it is possible to minimize a thickness of the touch sensor, and all of the conductive patterns are formed on the single surface, so that the manufacturing method is easy. Further, the touch sensor is in the one sheet type, so that the present application has an advantage in that the lamination is not required compared to the related art in which the touch sensor is formed by using two or more sheets of substrates. Further, the sensing electrode unit and the driving electrode unit are present on the same surface, so that it is easy to install and attach a flexible printed circuit board (FPCB). Further, the touch sensor is in the one sheet type, so that light transmittance is excellent compared to the touch sensor in the two sheet type. Further, when a functional surface film is laminated on the surface of the touch sensor, a step is not large, so that there is an advantage in that bubbles are not generated.

According to one particular example of the present application, it is possible to improve a manufacturing process of a touch sensor to decrease manufacturing cost of the touch sensor, and improve lightness and thinness of the touch sensor.

BRIEF DESCRIPTION OF DRAWINGS

FIGS. 1 to 3 are diagrams schematically illustrating a touch sensor in the related art.

FIG. 4 is a diagram schematically illustrating a wiring electrode unit of the touch sensor in the related art.

FIGS. 5 to 16 are diagrams schematically illustrating a touch sensor according to an exemplary embodiment of the present application.

BEST MODE

Hereinafter, the present application will be described in detail.

In a case of an existing touch sensor, a product, in which a driving electrode pattern (Tx pattern) serving to drive as a voltage and a sensing electrode pattern (Rx pattern) which receives a signal of mutual capacitance with respect to the driving electrode pattern and transmits the received signal to a circuit are formed on separate substrates, respectively, or a driving electrode pattern and a sensing electrode pattern are formed on both surfaces of a substrate, respectively, that is, a product, in which a driving electrode pattern and a sensing electrode pattern are spatially separated, is a mainstream. A design and manufacturing of a touch sensor in consideration of a layer structure and a dielectric constant of a dielectric substance interposed in the layer structure in order to maximize touch sensitivity and a value of capacitance are accepted as core technologies. However, in the aforementioned method, the cost of the sensor is a continuous issue in an aspect that an optically clear adhesive (OCA) corresponding to the dielectric substance and two sheets of an indium tin oxide (ITO) film used as transparent electrodes are used, and in order to solve the cost issue, a technology for designing and manufacturing a touch sensor with one single surface layer, in which a driving electrode pattern (Tx pattern) and a sensing electrode pattern (Rx pattern) are present in one surface, is newly on the rise.

The touch sensor with the one single surface layer may be generally divided into a touch sensor by a method using self capacitance, a touch sensor by a method using mutual capacitance, and a touch sensor by an Fxy method using a metal bridge and the like. However, it is true that each of the method using the self capacitance and the method using the metal bridge cannot give large attract due to a performance issue (in a case of a self-capacitance, a ghost phenomenon and a limit of a multi-touch), an issue of yield between manufacturing processes, and the like.

Other than the two foregoing methods, the touch sensor by the method using mutual capacitance recently gets the large spotlight, and the reason is that the method using mutual capacitance has a main point that a region, in which capacitance is formed, is formed in a plane in the same space, so that there are an issue, such as sensitivity, and an issue of pattern manufacturing in an aspect that a wiring region is formed in a screen part, but the method using mutual capacitance has the most excellent characteristic in a performance aspect compared to other methods. Accordingly, active development for implementing the method using mutual capacitance in the ITO is conducted. However, the method using mutual capacitance also has an issue of resistance by a use of a material that is the ITO having relatively high resistance, such that it is true that applicability is limited to 5 inches or less.

In order to solve the problems, the present application presents a touch sensor with one single surface layer which uses a conductive metal line as a driving electrode pattern and a sensing electrode pattern.

A touch sensor with one single surface layer using an ITO electrode in the related art is schematically illustrated in FIGS. 1 and 2 below. Further, a driving electrode pattern and a sensing electrode pattern of the touch sensor with one single surface layer using an ITO electrode in the related art are illustrated in FIG. 3 below in more detail.

FIG. 3 illustrates a sensing electrode pattern (Rx pattern) and a driving electrode pattern (Tx pattern) that is an X-shaped pattern. That is, the sensing electrode pattern (Rx pattern) is designed to have a larger area than that of the driving electrode pattern (Tx pattern), and a signal is applied through a common electrode. In the meantime, the driving electrode pattern (Tx pattern) is implemented in an X-shaped pattern, and a wiring unit is formed through a dead zone for applying a signal to each of the driving electrode patterns (Tx patterns).

It is most preferable to minimize the dead zone according to the region of the wiring unit in terms of touch resolution, and to this end, it is necessary to appropriately adjust a width of a conductive metal line and/or a space of the dead zone. In this case, when the width of the space is equal to or larger than a predetermined numerical value, the pattern may be considered as a pattern advantageous in terms of interference of mutual signals. Further, in order to secure conductivity, the width of the conductive metal line needs to be large, and a smaller width of the space is advantageous to secure conductivity. Accordingly, it is preferable to appropriately adjust the width of the conductive metal line and/or the space of the dead zone.

Further, a portion other than the sensing electrode pattern, the driving electrode pattern, and the dead zone in FIG. 3 is an area corresponding to an area, in which a dummy electrode or a pattern is not formed, and may be an area which does not exert a large influence on substantial electrical connectivity.

In the present application, particular contents for configuring the driving electrode pattern and the sensing electrode pattern of the touch sensor with the one single surface layer with conductive metal lines are provided below.

In a case of a general ITO pattern, a concept of a line and a space is introduced to the forming of a wiring unit, so that it is general to form a wiring pattern having a form illustrated in FIG. 4. Accordingly, the present application introduces a design minimizing a space for securing connectivity of conductive metal lines and improving yield.

A touch sensor according to an exemplary embodiment of the present application includes: a substrate; and a driving electrode unit, a sensing electrode unit, and a wiring electrode unit provided on the same surface of the substrate, and the touch sensor includes a touch sensing region and a touch non-sensing region, each of the driving electrode unit, the sensing electrode unit, and the wiring electrode unit includes a conductive pattern including a shielding portion and an opening portion, the wiring electrode unit includes a first wiring electrode unit positioned in the touch sensing region of the touch sensor and a second wiring electrode unit positioned in the touch non-sensing region of the touch sensor, the first wiring electrode unit includes one or two or more bundles of wires connecting the driving electrode unit or the sensing electrode unit to the second wiring electrode unit, the conductive pattern configuring the touch sensing region includes a form, in which n repeat unit patterns are repeated in a width direction of the touch sensing region, and the second wiring electrode unit is provided in a touch non-sensing region provided to be adjacent to a lateral surface of an upper portion of the touch sensing region and a touch non-sensing region provided to be adjacent to a lateral surface of a lower portion of the touch sensing region.

In the present application, n may be an integer of 2 to 100, but is not limited thereto.

In the present application, each of the driving electrode unit, the sensing electrode unit, and the wiring electrode unit includes a conductive pattern including a shielding portion and an opening portion. The shielding portion means a region, in which a material, for example, a conductive metal line, configuring conductive patterns of the driving electrode unit, the sensing electrode unit, and the wiring electrode unit, is provided, on the substrate, and the opening portion means a region, in which the conductive metal line is not provided, on the substrate. That is, the shielding portion may mean an optically non-transparent region, and for example, transmittance of the shielding portion may be 20% or less, and may be 10% or less.

In the present application, as the mesh pattern, a pattern shape, such as a mesh pattern, known in the art may be used. The mesh pattern may include a polygonal pattern including one or more shapes of a triangle, a quadrangle, a pentagon, a hexagon, and an octagon.

In the present application, at least some of the bundles of the first wiring electrode unit may be connected to the second wiring electrode unit provided in the touch non-sensing region provided to be adjacent to the lateral surface of the upper portion of the touch sensing region, and the other bundles of the first wiring electrode unit may be connected to the second wiring electrode unit provided in the touch non-sensing region provided to be adjacent to the lateral surface of the lower portion of the touch sensing region.

In the present application, based on a vertical straight axis bisecting the touch sensor, the conductive patterns provided in the touch sensing region and the touch non-sensing region may be symmetric to each other.

In the present application, the repeat unit pattern may include a conductive pattern of the driving electrode unit, a conductive pattern of the sensing electrode unit, and a conductive pattern of the first wiring electrode unit.

In the present application, a width D of the repeat unit pattern may be expressed with Equation 1 below.

$$D = A/(n \times m) \quad \text{[Equation 1]}$$

In Equation 1, A is a width of the touch sensing region, n is the number of repeat unit patterns, and m is a divisor of n.

The touch sensor according to the exemplary embodiment of the present application is schematically illustrated in FIGS. 5 and 6.

As illustrated in FIG. 5, according to the present application, the repeat unit patterns may be periodically provided in a horizontal direction (width direction) of the touch sensing region. In the present specification, the horizontal direction of the touch sensing region will be called an x-axis direction, and a vertical direction of the touch sensing region will be called a y-axis direction.

As illustrated in FIG. 5, in order for the Tx pattern to apply a signal to the Rx pattern, a trace is formed through the dead zone. When it is assumed that a width of the touch sensing region of the touch sensor is "A", the repeat unit patterns may be present in the x-axis direction. When it is assumed that a width of the dead zone that is the touch non-sensing region within the repeat unit pattern is "D", the number of nodes through which the trace connected from an FPCB bonding part is connected to each trace within the repeat unit pattern in the y-axis direction through the dead zone of the repeat unit pattern is defined as "n", and the number of grounds positioned in the repeat unit pattern is defined as "g", the maximum number of wires which may be positioned within the dead zone is (n+g). FIG. 5 is a diagram illustrating detailed shapes and the like of the node and the dead zone present within the repeat unit pattern. Particularly, in the present application, a design of a half mirror is conceived for maximally utilizing a space of the dead zone as illustrated in FIG. 6.

The touch sensor according to the exemplary embodiment of the present application is schematically illustrated in FIG. 7. FIG. 7 is a diagram illustrating a comparison between a half mirror design conceived for maximizing an area of the trace within the dead zone and an original diagram. In the half mirror design according to the present application, an area of the trace within the dead zone is maximized. More particularly, when it is assumed that a direction, in which the repeat unit patterns are periodically arranged, is "x" and the number of traces connected with the touch sensing region is "n", the half mirror design is a design which vertically isolates trace wiring to connect the trace wiring to the FPCB bonding part based on a position of $(n/2 \pm \frac{1}{2})$ when n is an odd number and a position of n/2 when n is an even number. It is possible to maximize a width of each trace line by minimizing the number of traces positioned in the x-axis direction within the defined dead zone by the foregoing method.

The touch sensor according to the exemplary embodiment of the present application is schematically illustrated in FIG. 8. When the width of the dead zone allowable in the original diagram of FIG. 7 is sufficiently large, it is not necessary to introduce the half mirror design, but in general, as a width of the dead zone is decreased, the touch sensing region is increased, and thus touch performance is improved. However, in order to achieve a target touch transmittance, a pitch of a basic figure (lattice) forming a mesh is limited, and extremely, a design in which the number of crossing points is one may be shown like the first drawing of FIG. 8. In the present application, in order to confirm a correlation between the number of crossing points and yield, channel yield according to a design was comparatively evaluated, and it was recognized that yield is varied according to the number of crossing points as illustrated in FIG. 8, and it could be confirmed that the minimum number of crossing points needs to be 1.5 or more.

The touch sensor according to the exemplary embodiment of the present application is schematically illustrated in FIG. 9. When the number of crossing points present in the same segment is called "C" and C/2 is defined as the number of crossing points positioned within the dead zone based on one predetermined crossing point within a unit dead zone, it is possible to stably secure yield of the trace when the number of crossing points of the traces within the touch sensing region is obtained by a minimum of 1.5 or more. More particularly, when it is defined that a width of a unit wiring unit (a width of a unit dead zone) within the touch sensing region is "D" (mm) and the number of crossing points per unit area is "P" (ea/mm$^2$), it is possible to stably obtain yield when P or more crossing points per unit area are secured through an equation of $P = 4.4/D^{1.99}$ (ea/mm$^2$).

The touch sensor according to the exemplary embodiment of the present application is schematically illustrated in FIG. 10. When it is defined that lines connecting disconnection points of the unit dead zone are U, U1, U2, . . . , U and U1 may be divided into a case where U and U1 are positioned in a crossing point of a polygonal mesh and a case where U and U1 are not positioned in a crossing point of a polygonal mesh. As illustrated in FIG. 10, in the case where the number of crossing points is 1.5, when a disconnection point is positioned at the crossing point, the number of crossing points is decreased even though the same disconnection line and a pitch of a polygonal mesh are represented. That is, except for a case where the number of crossing points is 1.5 and a disconnection point is positioned at the crossing point, when 1.5 or more crossing points within the trace of the wiring unit are secured, it is possible to secure yield of the trace within the touch sensing region.

The touch sensor according to the exemplary embodiment of the present application is schematically illustrated in FIG. 11. As illustrated in FIG. 11, when a form of a crossing point of a mesh is changed, the number of crossing points per unit area at the same pitch of the mesh is increased, thereby securing yield of the wiring unit within the touch sensing region. Further, when the number of crossing points of the wiring unit within the touch sensing region is one or more, a flow of electrically current carrying is bisected, thereby improving yield.

The touch sensor according to the exemplary embodiment of the present application is schematically illustrated in FIGS. 12 and 13. As illustrated in FIG. 12, in the present application, it is assumed that a vertical distal end of any one of the repeat unit patterns is "S", and a vertical distal end of another repeat unit pattern is "S1".

As illustrated in FIGS. 12 and 13, when a virtual line simultaneously bisecting respective sides, in which disconnection points are positioned, is drawn in polygons including disconnection lines around S and S1 inside the repeat unit pattern, shapes of the patterns of S and S1 may be the same as each other, and patterns of closed figures of S and S1 formed of the disconnection line may be the same as each other, which results from the periodicity of the repeat unit pattern. In this case, the disconnection point may be divided into a case including the crossing point of the polygonal mesh pattern or a case including no crossing point of the polygonal mesh pattern.

The touch sensor according to the exemplary embodiment of the present application is schematically illustrated in FIGS. 14 and 15.

In the present application, when the case where the disconnection point does not include the crossing point of the polygonal mesh pattern is considered, a position of the disconnection point may be allowed with any disconnection line form when an entire shape of the closed figure including the disconnection line is not changed. The regularity may be allowed to a structure of the touch sensor including various polygonal mesh patterns. However, when convenience in designing a touch sensor is considered, a case where the disconnection points are positioned at the same position in S and S1 based on the virtual line simultaneously bisecting the respective sides including the disconnection lines within the closed figures including the disconnection lines around S and S1 may be the most reasonable in terms of repetitiveness of the design and convenience according to the repetitiveness of the design.

The touch sensor according to the exemplary embodiment of the present application is schematically illustrated in FIG. 16.

In the present application, the conductive patterns of the driving electrode unit, the sensing electrode unit, and the wiring electrode unit are formed of regular polygonal mesh patterns, and the repeat unit pattern may satisfy Equation 5 below.

$$0 < A_s + A_{s1} < 2A_L \quad \text{[Equation 5]}$$

In Equation 5, $A_S$ means an area of one first polygon which is provided within the repeat unit pattern and includes any one vertical distal end of the repeat unit pattern, $A_{S1}$ means an area of one second polygon which is provided within the repeat unit pattern and includes another vertical distal end of the repeat unit pattern, $A_L$ means an area of the one regular polygon, and the first polygon and the second polygon are provided so as to share the same horizontal axis of the repeat unit pattern.

Further, the repeat unit pattern may satisfy Equation 6 below.

$$0 < A_s + A_{s1} = A_L \quad \text{[Equation 6]}$$

In the present application, the first wiring electrode unit includes one or two or more bundles of the wires connecting the driving electrode unit or the sensing electrode unit to the second wiring electrode unit, and each of the wires is formed of a mesh pattern, and in the bundle including the maximum number of wires among the bundles, a width W of the bundle, the number n2 of wires included in the bundle, and a minimum value P among distances between center points of adjacent mesh structures sharing at least one side among the mesh patterns forming the wires may satisfy Equation 2 below.

$$\frac{W}{n2} \times \sqrt{2} \geq P \quad \text{[Equation 2]}$$

In the present application, the distance between the center points of the adjacent mesh structures sharing at least one side among the mesh patterns forming the wires may correspond to a pitch of a mesh pattern when the mesh pattern is a regular mesh pattern, and may correspond to a distance between center points of the adjacent polygonal patterns sharing at least one side or a distance between center points of gravity when the mesh pattern includes a polygonal pattern including various forms.

In the exemplary embodiment of the present application, Equation 2 may be expressed with Equation 3 below.

$$\frac{W}{n2} \geq P \times \cos\theta 1 \quad \text{[Equation 3]}$$

In Equation 3, W, n2, and P are the same as those defined in Equation 2, and θ1 represents a small value among the angles between a straight line continuing in a width direction of the bundle with the shortest distance and straight lines connecting center points of the adjacent mesh structures sharing at least one side with the shortest distance.

In the exemplary embodiment of the present application, a touch sensing region of the touch sensor may include a driving electrode unit, a sensing electrode unit, and a first wiring electrode unit. Further, the touch non-sensing region of the touch sensor may include a second wiring electrode unit. In the present application, the touch sensing region may also be expressed with a term, such as a touch sensitive region, a touch permittable region, and a touch activation region.

In the present application, the bundle is formed in a pattern shape, in which a closed figure having two disconnection points is continuously disposed in a direction from one side of the substrate adjacent to an end of the second wiring electrode to the other side of the substrate facing the one side, and a virtual straight line connecting the adjacent disconnection points of the continuously disposed closed figures with the shortest distance has one or more inflection points, an angle formed by the virtual straight line at the inflection point is 90° or more, and a pattern that is in contact with the virtual straight line may electrically connect the driving electrode unit or the sensing electrode unit to the second wiring electrode unit.

In the present application, the disconnection point means a region in which a part of a boundary pattern of the closed figure is disconnected to cut an electrical connection of the boundary pattern, and may be expressed with a term, such as a disconnection point and a disconnection part. That is, when the wiring electrode unit includes a pattern formed of a conductive metal line, the pattern may include two or more metal lines spaced apart from each other in a longitudinal direction of the conductive metal line by the disconnection point.

In this case, as a result of an evaluation of moiré for the conductive pattern after a line width of a conductive pattern of the wiring electrode unit is split with various line widths to manufacture the conductive pattern, it was confirmed that when an average diameter of the disconnection point or a width of the disconnection part is within 13 μm, moiré by the wiring electrode unit is not generated while fully bonding the wiring electrode unit to a display, and it was confirmed that a case where an average diameter of the disconnection point or a width of the disconnection part is 7 μm or less is most advantageous.

In the present application, the average diameter of the disconnection point or the width of the disconnection part may mean a distance between closest distal ends of the two or more spaced conductive metal lines. The distance between the closest distal ends of the two or more spaced conductive metal lines means a distance between the distal ends which are most adjacent to each other in the two or more conductive metal lines which are spaced apart from each other.

In the exemplary embodiment of the present application, Equation 2 may be expressed with Equation 4 below.

$$\frac{W}{n2} \geq P \times \cos\theta 2 \qquad \text{[Equation 4]}$$

In Equation 4, W, n2, and P are the same as those defined in Equation 2, and θ2 represents a small value among the angles between a straight line in a vertical direction with respect to a virtual straight line connecting the disconnection points with the shortest distance, and a straight line connecting the center points of the adjacent mesh structures sharing at least one side with the shortest distance.

In the exemplary embodiment of the present application, a part, which has the longest distance between the inflection points, in the virtual straight line may be parallel to at least one side configuring the closed figure or may form an angle more than 0° and less than 90°.

In the exemplary embodiment of the present application, at least a part of the conductive patterns of the driving electrode unit and the sensing electrode unit may additionally include the aforementioned disconnection point or disconnection part. In this case, an average diameter of the disconnection point or a width of the disconnection part may be 13 μm or less, may be 10 μm or less, and may be 7 μm or less, but is not limited thereto.

In the present application, when it is assumed that a width of the bundle is "W", based on an area of W×W, an opening ratio deviation between predetermined regions of the touch sensor corresponding to the area of W×W may be 10% or less, may be 5% or less, and may be 3% or less, but is not limited thereto. The predetermined regions of the touch sensor may include a region inside the driving electrode unit, a region inside the sensing electrode unit, a region inside the wiring electrode unit, a combined region of the driving electrode unit and the sensing electrode unit, a combined region of the driving electrode unit and the wiring electrode unit, and a combined region of the sensing electrode unit and the wiring electrode unit.

In the exemplary embodiment of the present application, the driving electrode unit and the sensing electrode unit may be formed of the conductive metal line, and the disconnection point or the disconnection part may be provided in a crossing point region, in which the conductive metal lines within the driving electrode unit or the sensing electrode unit cross each other, but the present application is not limited thereto. When the disconnection point is provided in the crossing point region, in which the conductive metal lines within the driving electrode unit or the sensing electrode unit cross each other, a diameter of the disconnection point may be 40 μm or less and may be 20 μm or less in terms of a moiré characteristic and visibility and the like, but is not limited thereto.

Further, an electrically isolated conductive metal line may be additionally provided within a predetermined distance based on a center of the disconnection point or the disconnection part. A length of the electrically isolated conductive metal line is not particularly limited, and may be within a deviation of 10% with the average diameter of the disconnection point or the width of the disconnection part. Further, the electrically isolated conductive metal line may also be provided to be parallel to the disconnection point or the disconnection part, and may also be vertical to the disconnection point or the disconnection part or irregularly provided. Further, the electrically isolated conductive metal line may have an area of 80% to 120% of a multiplication of the average diameter of the disconnection point or the width of the disconnection part and a line width of the conductive metal line. Further, a distance between a distal end of the electrically isolated conductive metal line and a distal end of a conductive metal line adjacent to the distal end of the electrically isolated conductive metal line may be 13 μm or less. A size, a form, a length, and the like of the electrically isolated conductive metal line may be appropriately adjusted so that a deviation of an opening ratio between the predetermined regions of the touch sensor is within 10%.

An important point together with the hiding of the conductive pattern may be a minimization of the dead zone within the wiring electrode unit as mentioned above.

In the present application, in order to confirm a design for minimizing the dead zone, a pitch and an angle of the conductive metal line pattern of the wiring electrode unit were observed by changing the pitch and the angle of the conductive metal line pattern of the wiring electrode unit while fixing a width of the bundle of the wiring electrode unit.

As a result, in a case where the conductive pattern configuring the wiring electrode unit is a mesh pattern and the mesh pattern is a square shape, when it is assumed that a width of the bundle is "W", a pitch of the mesh pattern is "P", and the number of wires included in the bundle is "n", it could be seen that when the relation of Equation 1 is satisfied, a width of the bundle is formed regardless of the change in an angle of the mesh pattern.

In this case, it could be seen that there is no big difficulty to form the wiring electrode unit even when directionality of the disconnection line for forming the wiring electrode unit is not straight, and it could be seen that a case where a moiré avoidance angle is 45° which is the best case is advantageous in every case.

Herein, the directionality of the disconnection line means a direction of a line displayed when the adjacent disconnection points or disconnection parts are connected with the shortest distance. Even when the directionality of the disconnection line for forming the wiring electrode unit is not straight, for example, a zigzag line and a combination of a straight line and a zigzag line, it is possible to set a direction of a flow of a current similar to that of a case where the directionality of the disconnection line is straight through an appropriate design of a position of the disconnection line.

Further, the touch sensor according to the present application may recognize a touch input by using a mutual capacitance method. Particularly, the touch sensor according to the present application aims for an electrical disconnection between the driving electrode unit and the sensing electrode unit by using the disconnection point or the disconnection part, a dummy pattern, and the like without inserting a separate insulating material between the driving electrode unit and the sensing electrode unit, and is different from a touch sensor using a metal bridge, an insulating layer, and the like in the related art.

In the present application, each of the conductive patterns of the driving electrode unit, the sensing electrode unit, and the wiring electrode unit may also be formed by an independent printing process, and the conductive patterns of the driving electrode unit, the sensing electrode unit, and the wiring electrode unit may also be simultaneously formed by a one-time printing process.

Accordingly, the conductive patterns of the driving electrode unit, the sensing electrode unit, and the wiring electrode unit may have the same line height.

Further, at least a part of the conductive patterns of the driving electrode unit and the wiring electrode unit includes a connection region, and the connection region may have no joint. Further, at least a part of the conductive patterns of the sensing electrode unit and the wiring electrode unit includes a connection region, and the connection region may have no joint.

In the present application, no joint means that there is no artificially connected trace in the physically connected conductive pattern. Typically, pattern forms and sizes of a touch unit and a wiring unit are different and thus the touch unit and the wiring unit are formed by different methods in the related art, so that a joint is inevitably formed in a portion in which the patterns of the touch unit and the wiring unit are connected. However, in the present application, it is possible to form a touch unit, a wiring unit, and the like by using one process, so that the present application may have a characteristic that there is no joint and line heights of the patterns of the touch unit, the wiring unit, and the like are the same.

In the present application, the same line height means that a standard deviation of a line height is less than 10%, preferably, less than 5%, or more preferably, less than 2%.

In the present application, the conductive patterns of the driving electrode unit, the sensing electrode unit, and the wiring electrode unit are provided on the substrate, and all of the conductive patterns of the driving electrode unit, the sensing electrode unit, and the wiring electrode unit may be provided on the same surface of the substrate.

A high hardness hard coating layer may be additionally included in at least one surface of the substrate. In this case, the high hardness hard coating layer is provided on any one surface of the substrate, and the conductive patterns of the driving electrode unit, the sensing electrode unit, and the wiring electrode unit may be provided on the other surface of the substrate, but the present application is not limited thereto. Further, the conductive patterns of the driving electrode unit, the sensing electrode unit, and the wiring electrode unit may be provided on the high hardness hard coating layer, but the present application is not limited thereto.

The high hardness hard coating layer may include: a monomer for a binder including 3 to 6-functional acrylate-based monomers; inorganic particles; a photoinitiator; and an organic solvent, and be formed by using a hard coating composition, in which, for a solid including the monomer for the binder, the inorganic particles, and the photoinitiator, a weight ratio of the solid:the organic solvent is 70:30 to 99:1.

Further, the high hardness hard coating layer may be formed by using a hard coating composition in a solvent free form including: a monomer for a binder including 3 to 6-functional acrylate-based monomers; inorganic particles; and a photoinitiator.

Particular contents of the hard coating composition are provided below.

The term "acrylate-based" means all of methacrylate or the derivatives in which a substituent is introduced to acrylate or methacrylate, as well as acrylate.

The 3 to 6-functional acrylate-based monomers may include trimethylol propane triacrylate (TMPTA), trimethylol propane ethoxy triacrylate (TMPEOTA), glycerine propoxylated triacrylate (GPTA), pentaerythritol tetra acrylate (PETA), or dipentaerythritol hexa acrylate (DPHA). The 3 to 6-functional acrylate-based monomers may be solely used or may be combined with different types and used.

According to the exemplary embodiment of the present invention, the monomer for the binder may further include 1 to 2-functional acrylate-based monomers.

The 1 to 2-functional acrylate-based monomers may include, for example, hydroxyl ethylacrylate (HEA), hydroxylethyl methacrylate (HEMA), hexandiol diacrylate (HDDA), tripropyleneglycol diacrylate (TPGDA), or ethylene glycol diacrylate (EGDA). The 1 to 2-functional acrylate-based monomers may be solely used or may be combined with different types and used.

According to the exemplary embodiment of the present invention, the monomer for the binder may be included with about 35 to about 85 parts by weight or about 45 to about 80 parts by weight with respect to 100 parts by weight of the solid including the monomer for the binder, the inorganic particles, and the photoinitiator. When the monomer for the binder has the foregoing range, a hard coating film which exhibits high hardness and excellent processability and has little curl or crack generation may be formed.

Further, when the monomer for the binder additionally includes the 1 to 2-functional acrylate-based monomers, a content ratio of the 1 to 2-functional acrylate-based monomers and the 3 to 6-functional acrylate-based monomers is not particularly limited, but according to the exemplary embodiment of the present invention, the 1 to 2-functional acrylate-based monomers and the 3 to 6-functional acrylate-based monomers may be included so as to have a weight ratio of about 1:99 to about 50:50, about 10:90 to about 50:50, or about 20:80 to about 40:60. When the 1 to 2-functional acrylate-based monomers and the 3 to 6-functional acrylate-based monomers are included with the weight ratio, it is possible to assign high hardness and flexibility without a degradation of a curl characteristic or other properties, such as light resistance.

According to another exemplary embodiment of the present application, the monomer for the binder may further include a photo-curable elastic polymer.

Throughout the present specification, the photo-curable elastic polymer means a polymer material which includes a functional group which may be polymerized by radiation of ultraviolet rays and exhibits elasticity.

According to the exemplary embodiment of the present application, the photo-curable elastic polymer may have elongation of about 15% or more, for example, about 15 to about 200%, about 20 to about 200%, or about 20 to about 150% when being measured by the ASTM D638.

When the hard coating composition of the present application further includes the photo-curable elastic polymer, the photo-curable elastic polymer is cross-linked and polymerized with the 3 to 6 functional acrylate-based monomer to form a hard coating layer after hardening, and may assign flexibility and impact resistance to the formed hard coating layer.

When the monomer for the binder further includes the photo-curable elastic polymer, a content ratio of the photo-curable elastic polymer and the 3 to 6 functional acrylate-based monomer is not specially limited, but according to the exemplary embodiment of the present invention, the photo-curable elastic polymer and the 3 to 6 functional acrylate-based monomer may be included to have a weight ratio of about 5:95 to about 20:80. When the 3 to 6 functional acrylate-based monomer and the photo-curable elastic polymer are included with the foregoing weight ratio, it is possible to assign high hardness and flexibility to the hard coating layer without a degradation of a curl characteristic or other properties, such as light resistance, and particularly, it is possible to prevent the hard coating layer from being damaged by external impact to secure excellent impact resistance.

According to the exemplary embodiment of the present application, the photo-curable elastic polymer may be a polymer or an oligomer of which weight-average molecule weight is in a range of about 1,000 to about 600,000 g/mol or about 10,000 to about 600,000 g/mol.

For example, the photo-curable elastic polymer may be one or more kinds selected from the group consisting of polycaprolactone, a urethane acrylate-based polymer, and polyrotaxane.

Polycaprolactone among the materials usable as the photo-curable elastic polymer is formed by ring opening polymerization of caprolactone, and has an excellent property, such as flexibility, impact resistance and durability.

The urethane acrylate-based polymer includes a urethane bond and has a characteristic of excellent elasticity and durability.

The polyrotaxane means a compound in which a dumbbell shaped molecule and a cyclic compound (macrocycle) are structurally fitted. The dumbbell shaped molecule includes a uniform linear molecule and blocking groups disposed at both distal ends of the linear molecule, and the linear molecule passes through an internal side of the cyclic compound, and the cyclic compound may move along the linear molecule, and is prevented from being separated by the blocking group.

According to the exemplary embodiment of the present application, the hard coating composition may include a rotaxane compound including: a cyclic compound combined with a lactone-based compound in which a (meta)acrylate-based compound is introduced to a distal end; a linear molecule passing through the cyclic compound; and blocking groups disposed at both distal ends of the linear molecule to prevent the cyclic compound from being separated.

In this case, when the cyclic compound has a size enough to pass through or surround the linear molecule, the cyclic compound may be used with a particular limit, and may also include a functional group, such as a hydroxyl group, an amino group, a carboxyl group, a thiol group, or an aldehyde group, which may react with other polymers or compounds. Particular examples of the cyclic compound may include α-cyclodextrin, β-cyclodextrin, γ-cyclodextrin, or a mixture thereof.

Further, a compound which has predetermined molecule weight or more and has a straight chain form may be used as the linear molecule without a large limit, and a polyalkylene-based compound or a polylactone-based compound may be used. Particularly, a polyoxyalkylene-based compound including an oxyalkylene repeat unit of carbon numbers 1 to 8 or a polylactone-based compound having a lactone-based repeat unit of carbon numbers 3 to 10 may be used.

In the meantime, the blocking group may be appropriately adjusted according to a characteristic of the prepared rotaxane compound, and for example, one kind or two or more kinds selected from the group consisting of a dinitrophenyl group, a cyclodextrin group, an adamantane group, a trityl group, a fluorescein group, and a pyrene group may be used.

The polyrotaxane compound has excellent scratch resistance, so that when a scratch or external damage is generated, the hard coating layer may exhibit autogenous healing performance.

The hard coating composition of the present application includes inorganic particles. In this case, the inorganic particles may be included in a form dispersed in the monomer for the binder.

According to the exemplary embodiment of the present application, inorganic particles having a nano scale grain size, for example, nano particles having a grain size of about 100 nm or less, about 10 to about 100 nm, or about 10 to about 50 nm may be used as the inorganic particles. Further, for example, silica particles, aluminum oxide particles, titanium oxide particles, or zinc oxide particles may be used as the inorganic particles.

The hard coating composition includes the inorganic particles, so that it is possible to further improve hardness of the hard coating film.

According to the exemplary embodiment of the present application, the inorganic particles may be included with about 10 to about 60 parts by weight or about 20 to about 50 parts by weight with respect to 100 parts by weight of the solid including the monomer for the binder, the inorganic particles, and the photoinitiator. The hard coating composition includes the inorganic particles with the foregoing range, so that it is possible to achieve an effect of the improvement of hardness of the hard coating film according to the addition of the inorganic particles within the range in which a property is not degraded.

The hard coating composition of the present application includes a photoinitiator.

According to the exemplary embodiment of the present application, the photoinitiator may include 1-hydroxy-cyclohexyl-phenyl ketone, 2-hydroxy-2-methyl-1-phenyl-1- propanone, 2-hydroxy-1-[4-(2-hydroxyetoxy)phenyl]-2-methyl-1-propanone, methyl benzoylformate, α,α-dimethoxy-α-phenylacetophenone, 2-benzoil-2-(dimethylamino)-1-[4-(4-morpholinyl)phenyl]-1-butanone, 2-methyl-1-[4-(methylthio)phenyl]-2-(4-morpholinyl)-1-propanone diphenyl(2,4,6-trimethylbenzoyl)-phosphine oxide, or bis(2,4,6-trimethylbenzoyl)-phenylphoshine oxide, but is not limited thereto. Further, a product currently on the market as the photoinitiator includes Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and the like. The photoinitiators may be separately used or two or more different types of photoinitiators may be mixed and used.

According to the exemplary embodiment of the present invention, the photoinitiator may be included with about 0.5 to about 10 parts by weight or about 1 to about 5 parts by weight with respect to 100 parts by weight of the solid including the monomer for the binder, the inorganic particles, and the photoinitiator. When the photoinitiator is within the foregoing range, it is possible to achieve sufficient cross-linking photopolymerization without degrading a property of the hard coating film.

In the meantime, the hard coating composition of the present application may additionally include an addition agent, such as a surfactant, a yellowing preventing agent, a leveling agent, and an antifouling agent, typically used in the art to which the present application belongs, in addition to the foregoing monomer for the binder, inorganic particles, and photoinitiator. Further, the content of the adhesive is variously adjustable within a range, in which a property of the hard coating composition of the present application is not degraded, so that the content of the adhesive is not specially limited, but the adhesive may be included with, for example, about 0.1 to about 10 parts by weight with respect to 100 parts by weight of the solid.

According to the exemplary embodiment of the present application, for example, the hard coating composition may include a surfactant as an addition agent, and the surfactant may be a fluoro-based acrylate of 1 to 2 functionality, a fluoro-based surfactant, or a silicon-based surfactant. In this case, the surfactant may be included in a form dispersed or cross-linked within the crosslinked copolymer.

Further, the hard coating composition may include a yellowing preventing agent as the addition agent, and the yellowing preventing agent may include a benzophenone-based compound or a benzotriazol-based compound.

The hard coating composition of the present application includes an organic solvent.

In the hard coating composition according to the exemplary embodiment of the present application, the organic solvent may be included within a range of a weight ratio of the solid:the organic solvent which is about 70:30 to about 99:1 with respect to the solid including the monomer for the binder, the inorganic particles, and the photoinitiator. The hard coating composition of the present invention includes the solid with a high content as described above to obtain a composition with high viscosity, and thus thick coating is available, so that it is possible to form the hard coating layer having a high thickness, for example, 50 µm or more.

According to the exemplary embodiment of the present application, an alcohol-based solvent, such as methanol, ethanol, isopropyl alcohol, and butanol, an alkoxy alcohol-based solvent, such as 2-methoxyethanol, 2-ethoxyethanol, and 1-methoxy-2-propanol, a ketone-based solvent, such as acetone, methyl ethyl ketone, methylisobutylketone, methylpropylketone, and cyclohexanon, an ether-based solvent, such as propyleneglycolmonopropylether, propyleneglycolmonomethylether, ethyleneglycolmonoethylether, ethyleneglycolmonopropylether, ethyleneglycolmonobutylether, diethyleneglycolmonomethylether, diethylglycolmonoethylether, diethylglycolmonopropylether, diethylglycolmonobutylether, diethyleneglycol-2-ethylhexylether, an aromatic solvent, such as benzene, toluene, and xylene, and the like may be solely used or may be mixed and used as the organic solvent.

According to the exemplary embodiment of the present application, when viscosity of the hard coating composition is within a range having appropriate fluidity and coating performance, the viscosity of the hard coating composition is not particularly limited, but the hard costing composition has a relatively high content of the solid, thereby exhibiting high viscosity. For example, the hard coating composition of the present invention may have viscosity of about 100 to 1,200 cps, about 150 to 1,200 cps, or about 300 to 1,200 cps at a temperature of 25° C.

The solvent type or solvent-free type hard coating composition of the present invention including the foregoing ingredients is applied onto a support substrate and then is photocured to form a hard coating layer.

In a hard coating film to be used as a cover of a mobile communication terminal or a tablet PC, it is important to improve hardness of the hard coating film to a level to replace glass with the hard coating film, and in order to improve hardness of the hard coating film, a thickness of the hard coating layer basically needs to be increased by a predetermined thickness or more, for example, µm, 70 µm, or 100 µm or more. However, when the thickness of the hard coating layer is increased, a curl phenomenon by a hardening contraction is increased, so that bonding force is decreased and development of the hard coating film is easily generated. Accordingly, a process of planarizing the support substrate may be additionally performed, but the hard coating layer has a crack during the planarization process, so that the process of planarizing the support substrate is not preferable.

Even though the hard coating composition according to the present application is applied onto the support substrate with a high thickness and is photocured in order to form a hard coating layer with high hardness, the hard coating composition may form the hard coating layer having minimal generation of a curl or a crack and having high transparency and high hardness. For example, it is possible to form a hard coating layer having a thickness of about 50 µm or more, for example, about 50 to about 150 µm or a thickness of about 70 to about 100 µm, by using the hard coating composition of the present application.

When a hard coating layer is formed by using the hard coating composition of the present application, the hard coating layer may be formed by a typical method used in the art to which the present invention belongs.

For example, first, the hard coating composition according to the present application is applied onto one surface of a support substrate. In this case, a method of applying the composition is not particularly limited when the method is usable in the art to which the present invention belongs, and for example, a bar coating method, a knife coating method, a roll coating method, a blade coating method, a die coating method, a microgravure coating method, a comma coating method, a slot die coating method, a lip coating method, or a solution coating method may be used.

After the hard coating composition is applied, an operation of stabilizing the surface on which the hard coating composition is applied may be selectively performed. The stabilization operation may be performed, for example, by processing the support substrate on which the hard coating composition is applied at a predetermined temperature. Accordingly, the surface on which the hard coating composition is applied is planarized and volatile ingredients included in the hard coating composition are volatilized, thereby further stabilizing the surface on which the hard coating composition is applied.

Next, a hard coating layer may be formed by photocuring the applied hard coating composition by radiating ultraviolet rays to the applied hard coating composition.

When the hard coating layer is formed on both surfaces of the support substrate by using the hard coating composition of the present application, the hard coating layer may be formed by a two stage process in which a first hard coating composition is firstly applied onto one surface of the support substrate and is firstly photocured, and then a second hard coating composition is secondly applied onto the other surface, that is, a rear surface, of the support substrate and is secondly photocured.

In the secondary photocuring operation, the ultraviolet rays are radiated to the side opposite to the side on which the first hard coating composition is applied, so that a curl generated by hardening and contraction in the first photocuring operation is offset in an opposite direction to obtain a flat hard coating film. Accordingly, an additional planarization process is not necessary.

When a film including the hard coating layer formed by using the hard coating composition of the present application is exposed to a temperature of 50° C. or higher and humidity of 80% or more for 70 hours or more and then is positioned on a plane, a maximum value of a distance from each corner or one side of the film to the plane may be about 1.0 mm or less, about 0.6 mm or less, or about 0.3 mm or less. More particularly, when the film including the hard coating layer formed by using the hard coating composition of the present application is exposed to a temperature of 50 to 90° C. and humidity of 80 to 90% for 70 to 100 hours and then is positioned on a plane, a maximum value of a distance from each corner or one side of the film to the plane may be about 1.0 mm or less, about 0.6 mm or less, or about 0.3 mm or less.

The film including the hard coating layer formed by using the hard coating composition of the present application exhibits excellent hard hardness, scratch resistance, high transparency, durability, light resistance, and optical transmittance, thereby being usefully used in various fields.

For example, the film including the hard coating layer formed by using the hard coating composition of the present application may have pencil hardness of 7 H or more, 8 H or more, or 9 H or more at weight of 1 kg.

In the present application, the high hardness hard coating layer may be provided on any one surface of the substrate, and may also be provided on both surfaces of the substrate.

In the present application, each of the conductive patterns of the driving electrode unit, the sensing electrode unit, and the wiring electrode unit may independently include a pattern formed of a conductive metal line. The pattern formed of the conductive metal line may include a closed curve formed of a straight line, a curved line, or the straight line and the curved line.

The conductive patterns of the driving electrode unit and the sensing electrode unit may also be independently regular patterns, and may also be irregular patterns.

As the regular pattern, a pattern shape, such as a mesh pattern, known in the art may be used. The mesh pattern may include a regular polygonal pattern including one or more shapes of a triangle, a quadrangle, a pentagon, a hexagon, and an octagon.

In the present application, the conductive patterns of the driving electrode unit and the sensing electrode unit are regular patterns and include crossing points formed by crossing a plurality of predetermined lines among the lines forming the patterns, and in this case, the number of crossing points may be 3,000 to 122,500, may be 13,611 to 30,625, and may be 19,600 to 30,625 in an area of 3.5 cm×3.5 cm. Further, according to the present application, it was confirmed that in the case where the number of crossing points is 4,000 to 123,000 when the hard coating layer is provided in a display, the hard coating layer exhibits a light characteristic that the optical characteristic of the display is not largely spoiled.

Further, according to the present application, the conductive patterns of the driving electrode unit and the sensing electrode unit are irregular patterns and include crossing points formed by crossing a plurality of predetermined lines among the lines forming the patterns, and in this case, the number of crossing points may be 6,000 to 245,000, may be 3,000 to 122,500, may be 13,611 to 30,625, and may be 19,600 to 30,625 in an area of 3.5 cm×3.5 cm. Further, according to the present application, it was confirmed that in the case where the number of crossing points is 4,000 to 123,000 when the hard coating layer is provided in a display, the hard coating layer exhibits a light characteristic that the optical characteristic of the display is not largely spoiled.

Pitches of the conductive patterns of the driving electrode unit, the sensing electrode unit, and the wiring electrode unit may be 600 μm or less and may be 250 μm or less, but the pitch may be adjusted according to transmittance and conductivity required by the person with ordinary skill in the art.

A material having specific resistance of $1 \times 10^6$ ohm·cm to $30 \times 10^6$ ohm·cm is appropriate as the material of the conductive patterns of the driving electrode unit, the sensing electrode unit, and the wiring electrode unit used in the present application, and a material having specific resistance of $7 \times 10^6$ ohm·cm or less is more preferable.

In the present application, the conductive patterns of the driving electrode unit and the sensing electrode unit may be irregular patterns.

The irregular pattern includes a border structure of continuously connected closed figures, the closed figures having the same shape are not present in a predetermined irregular unit area (1 cm×1 cm), and the number of vertices of the closed figures may be different from the number of vertices of the quadrangles having the same number as that of the closed figures. More particularly, the number of vertices of the closed figures may be greater than the number of vertices of quadrangles having the same number as the number of the closed figures, and may be greater by 1.9 times to 2.1 times of the number of vertices of quadrangles having the same number as the number of the closed figures, but is not limited thereto.

The closed figures are continuously connected with one another, and for example, in the case where the closed figures are polygons, the adjacent closed figures may have a form sharing at least one side.

The irregular pattern includes the border structure of continuously connected closed figures, the closed figures having the same shape are not present in a predetermined unit area (1 cm×1 cm) in the irregular pattern, and the number of vertices of the closed figures may be different from the number of vertices of the polygon formed by connecting shortest distances between centers of gravity of the closed figures. More particularly, the number of vertices of the closed figures may be greater than the number of vertices of a polygon formed by connecting the shortest distance between centers of gravity of the closed figures, and may be greater by 1.9 times to 2.1 times of the number of vertices of a polygon formed by connecting the shortest distance between centers of gravity of the closed figures, but is not limited thereto.

The irregular pattern includes the border structure of the continuously connected closed figures, the closed figures having the same shape are not present in the predetermined unit area (1 cm×1 cm) in the irregular pattern, and in the closed figures, a value of Equation 1 below may be 50 or more.

(Standard deviation of distances between vertices/ average of distances between vertices)×100     [Equation 1]

The value of Equation 1 may be calculated within the unit area of the conductive pattern. The unit area may be an area in which the conductive pattern is formed, and, for example, may be an area of 3.5 cm×3.5 cm and the like, but is not limited thereto.

In the present application, it is defined that the vertex means a point at which the lines forming the borders of the closed figures of the conductive pattern cross each other.

The irregular pattern may have a form of the border structure of the closed figures obtained by disposing predetermined points in regularly arranged unit cells and then connecting the points to the closest points thereto as compared to the distances from other points.

In this case, when irregularity is introduced into a manner where predetermined points are disposed in the regularly arranged unit cells, the irregular pattern may be formed. For example, in the case where irregularity is provided as 0, when the unit cell is a square, the conductive pattern has a square mesh structure, and when the unit cell is a regular hexagon, the conductive pattern has a honeycomb structure. That is, the irregular pattern means a pattern of which irregularity is not 0.

By the conductive pattern having the irregular pattern shape according to the present application, it is possible to suppress a tipping phenomenon and the like of the line forming the pattern, obtain uniform transmittance from a display, maintain a line density with respect to a unit area at the same level, and secure uniform conductivity.

In the present application, the materials of the conductive patterns of the driving electrode unit, the sensing electrode unit, and the wiring electrode unit are not particularly limited, but may include one or more kinds selected from the group consisting of a metal, a metal oxide, a metal nitride, a metal oxynitride, and a metal alloy. A material which has excellent conductivity and is easily etched is preferable as the materials of the conductive patterns of the driving electrode unit, the sensing electrode unit, and the wiring electrode unit.

In the present application, even though the material having the total reflectance of 70 to 80% or more is used, it is possible to decrease the total reflectance, decrease visibility of the conductive pattern, and maintain or improve a contrast property.

Particular examples of the material of the conductive patterns of the driving electrode unit, the sensing electrode unit, and the wiring electrode unit may include a single film or a multilayered film including gold, silver, aluminum, copper, neodymium, molybdenum, nickel, or an alloy thereof. Herein, the thicknesses of the conductive patterns of the driving electrode unit, the sensing electrode unit, and the wiring electrode unit are not particularly limited, but the thickness of 0.01 to 10 μm is preferable in terms of the conductivity of the conductive pattern and the economic efficiency of the forming process thereof.

In the present application, line widths of the conductive patterns of the driving electrode unit and the sensing electrode unit may be 10 μm or less, may be 7 μm or less, may be 5 μm or less, may be 4 μm or less, may be 2 μm or less, or may be 0.1 μm or more. More particularly, the line widths of the conductive patterns of the driving electrode unit and the sensing electrode unit may be 0.1 to 1 μm, 1 to 2 μm, 2 to 4 μm, 4 to 5 μm, 5 to 7 μm, or the like, but is not limited thereto.

Further, the line widths of the conductive patterns of the driving electrode unit and the sensing electrode unit may be 10 μm or less and the thickness thereof may be 10 μm or less, the line widths of the conductive patterns of the driving electrode unit and the sensing electrode unit may be 7 μm or less and the thickness thereof may be 1 μm or less, or the line widths of the conductive patterns of the driving electrode unit and the sensing electrode unit may be 5 μm or less and the thickness thereof may be 0.5 μm or less.

More particularly, in the present application, the line widths of the conductive patterns of the driving electrode unit and the sensing electrode unit may be 10 μm or less, and in the conductive patterns of the driving electrode unit and the sensing electrode unit, the number of vertexes of the closed figures within the area of 3.5 cm×3.5 cm may be 6,000 to 245,000. Further, the line widths of the conductive patterns of the driving electrode unit and the sensing electrode unit may be 7 μm or less, and in the conductive patterns, the number of vertices of closed figures may be from 7,000 to 62,000 in an area of 3.5 cm×3.5 cm. Further, the line widths of the conductive patterns of the driving electrode unit and the sensing electrode unit may be 5 μm or less, and in the conductive patterns of the driving electrode unit and the sensing electrode unit, the number of vertices of closed figures may be from 15,000 to 62,000 in an area of 3.5 cm×3.5 cm.

Opening ratios of the conductive patterns of the driving electrode unit, the sensing electrode unit, and the wiring electrode unit, that is, a ratio of an area which is not covered by the pattern, may be 70% or more, 85% or more, and 95% or more. Further, the opening ratios of the conductive patterns of the driving electrode unit, the sensing electrode unit, and the wiring electrode unit may be 90 to 99.9%, but is not limited thereto.

Further, a predetermined area of 1 mm×1 mm of the conductive patterns of the driving electrode unit, the sensing electrode unit, and the wiring electrode unit includes one or more regions, in which opening ratios of the conductive patterns of the driving electrode unit, the sensing electrode unit, and the wiring electrode unit are different from one another, and a difference in the opening ratio may be 0.1 to 5%, but is not limited thereto.

Further, a line width of the conductive pattern of the wiring electrode unit may be 150 μm or less, may be 100 μm or less, may be 50 μm or less, may be 30 μm or less, may be 10 μm or less, and may be 0.1 μm or more, but is not limited thereto.

In the present application, at least a part of the conductive pattern of the wiring electrode unit may have a different line width from those of the driving electrode unit and the sensing electrode unit. In this case, a difference in the line width may be 5 to 100 μm, may be 5 to 30 μm, and may be 5 to 15 μm, but is not limited thereto.

In the present application, a printing method is used for forming the conductive patterns of the driving electrode unit, the sensing electrode unit, and the wiring electrode unit, thereby forming the conductive patterns of the driving electrode unit, the sensing electrode unit, and the wiring electrode unit, which have the small line widths and are precise, on the transparent substrate. The printing method may be performed by using a method, in which a paste or ink including a conductive pattern material is transferred on the transparent substrate in a desired pattern shape and then is sintered. The printing method is not particularly limited, and a printing method such as offset printing, screen printing, gravure printing, flexo printing, inkjet printing, and nano imprint may be used, and one or more complex methods among the methods may be used. The printing method may adopt a roll to roll method, a roll to plate method, a plate to roll method, or a plate to plate method.

In the present application, a reverse offset printing method may be applied in order to implement the precise conductive pattern. To this end, in the present application, a method, in which ink that may serve as a resist during etching is applied onto an entire surface of silicon-based rubber that is called a blanket, an unnecessary portion is removed by using an intaglio on which a pattern called a primary cliché is formed, a printing pattern left on the blanket is secondly transferred on a film or a substrate, such as glass, on which metal and the like are deposited, and a desired pattern is formed through sintering and etching processes, may be performed. In the case where the aforementioned method is used, there is an advantage in that resistance in a thickness direction may be uniformly maintained because the substrate, on which metal is deposited, is used and thus uniformity of line heights is ensured over the entire region. In addition to this, the present application may include a direct printing method, in which conductive ink, such as Ag ink, is directly printed by using the aforementioned reverse offset printing method and then is sintered to form a desired pattern. In this case, the line heights of the pattern may be made uniform by printing pressure, and conductivity may be provided by a heat sintering process for the purpose of connecting Ag nanoparticles due to inter-surface fusion, a microwave sintering process/a laser partial sintering process, or the like.

Particularly, when the conductive pattern of the wiring electrode unit is formed by the printing process, in order to implement a more precise conductive pattern, the printing may be performed in a direction vertical to a longitudinal direction of the conductive pattern of the wiring electrode unit during the printing process, but the present application is not limited thereto. That is, according to the exemplary embodiment of the present application, there is a characteristic that in order to secure dimensional stability of an FPCB bonding region, a printing direction may be set so that an FPCB bonding pad is disposed in a direction, in which the film is easily contracted and expanded.

In the present application, each of the conductive patterns of the driving electrode unit, the sensing electrode unit, and the wiring electrode unit may independently additionally include a darkening pattern provided in the region corresponding to each of the conductive patterns of the driving electrode unit, the sensing electrode unit, and the wiring electrode unit.

In the present application, a reflection type diffraction intensity of a reflection type diffraction image obtained by radiating light emitted from a point light source on one surface from which the darkening pattern of the touch sensing region is visible may be reduced by 60% or more as compared to the touch sensor having the same configuration except that the conductive pattern is formed of Al and does not include the darkening pattern. Herein, the reflection type diffraction intensity may be reduced by 60% or more, 70% or more, and 80% or more as compared to the touch sensor having the same configuration except that the conductive pattern is formed of Al and does not include the darkening pattern. For example, the reflection type diffraction intensity may be reduced by 60 to 70%, 70 to 80%, and 80 to 85%.

In the present application, total reflectance measured by using a total reflectance measuring device with an assumption of ambient light on one surface from which the darkening pattern of the touch sensing region is visible may be reduced by 20% or more as compared to the touch sensor having the same configuration except that the conductive pattern is formed of Al and does not include the darkening pattern. Herein, the total reflectance may be reduced by 20% or more, 25% or more, and 30% or more as compared to the touch sensor having the same configuration except that the conductive pattern is formed of Al and does not include the darkening pattern. For example, the total reflectance may be reduced by 25 to 50%.

In the present application, the darkening pattern of the touch sensing region may be provided on upper surfaces and/or lower surfaces of the conductive patterns of the driving electrode unit, the sensing electrode unit, and the wiring electrode unit, and may be provided on at least parts of the lateral surfaces of the conductive patterns of the driving electrode unit, the sensing electrode unit, and the wiring electrode unit, as well as the upper surfaces and the lower surfaces of the conductive patterns of the driving electrode unit, the sensing electrode unit, and the wiring electrode unit, and may be provided the entire upper surfaces, lower surfaces, and lateral surfaces of the conductive patterns of the driving electrode unit, the sensing electrode unit, and the wiring electrode unit.

In the present application, the darkening pattern of the touch sensing region is provided on the entire surfaces of the conductive patterns of the driving electrode unit, the sensing electrode unit, and the wiring electrode unit, so that it is possible to decrease visibility of the conductive patterns according to high reflectance of the conductive patterns of the driving electrode unit, the sensing electrode unit, and the wiring electrode unit. In this case, when the darkening pattern is bonded to a layer having high reflectance, such as the conductive layer, since the darkening pattern has destructive interference and self-light absorbance under a specific thickness condition, the quantity of light reflected by the darkening pattern is adjusted to be similar to the quantity of light reflected by the conductive patterns of the driving electrode unit, the sensing electrode unit, and the wiring electrode unit through the darkening pattern, and simultaneously, mutual destructive interference between two lights is guided under the specific thickness condition, thereby exhibiting an effect of reducing the reflectance by the conductive patterns of the driving electrode unit, the sensing electrode unit, and the wiring electrode unit.

In this case, in a color range of a pattern region formed of the darkening pattern and the conductive pattern, which is measured from the surface from which the darkening pattern of the touch sensing region according to the present application is visible, a value of L may be 20 or less, a value of A may be −10 to 10, and a value of B may be −70 to 70, a value of L may be 10 or less, a value of A may be −5 to 5, and a value of B may be 0 to 35, and a value of L may be 5 or less, a value of A may be −2 to 2, and a value of B may be 0 to 15 based on a CIE LAB color coordinate.

Further, the total reflectance of the pattern region formed of the darkening pattern and the conductive patterns of the driving electrode unit, the sensing electrode unit, and the wiring electrode unit which is measured from the surface from which the darkening pattern of the touch sensing region according to the present application is visible, may be 17% or less, 10% or less, or 5% or less based on external light of 550 nm.

Herein, the total reflectance means reflectance obtained in consideration of both diffuse reflectance and specular reflectance. The total reflectance is a value observed by setting the reflectance of an opposite surface of the surface of which reflectance is desired to be measured by using a black paste, a tape or the like to 0 and then measuring only the reflectance of the surface to be measured, and in this case, a diffuse light source that is most similar to the ambient light condition is introduced as the provided light source. Further, in this case, the measurement position of the reflectance is set based on a position that is inclined at about 7° from a vertical line of a hemisphere of an integrating sphere.

In the present application, the darkening pattern and the conductive patterns of the driving electrode unit, the sensing electrode unit, and the wiring electrode unit may be patterned simultaneously or separately, but layers for forming the respective patterns are separately formed.

However, it is most preferable to form the conductive pattern and the darkening pattern at the same time in order to allow the conductive pattern and the darkening pattern to be present on the precisely corresponding surfaces.

By forming the pattern as described above, it is possible to implement a fine conductive pattern required in a touch screen while optimizing and maximizing an effect of the darkening pattern itself. In the touch sensor, when the fine conductive pattern fails to be implemented, the property, such as resistance, required for the touch sensor, may not be achieved.

In the present application, since in the darkening pattern and the conductive patterns of the driving electrode unit, the sensing electrode unit, and the wiring electrode unit form, a separate pattern layer forms a laminate structure, the structure is different from a structure in which at least a portion of a light absorption material is recessed or dispersed in a conductive pattern, or a structure in which a part of a surface is physically or chemically modified by performing a surface treatment on a conductive layer of a single layer.

Further, in the touch sensor according to the present application, the darkening pattern is directly provided on the substrate or is directly provided on the conductive patterns of the driving electrode unit, the sensing electrode unit, and the wiring electrode unit without an interposed attachment layer or adhesive layer. The attachment layer or adhesive layer may affect durability or optical properties. In addition, a method of manufacturing the laminate included in the touch sensor according to the present application is totally different from a method in the case where the attachment layer or adhesive layer is used. Further, in the present application, an interference characteristic of the substrate or the conductive patterns of the driving electrode unit, the sensing electrode unit, and the wiring electrode unit and the darkening pattern is excellent compared to that of the case where the attachment layer or adhesive layer is used.

In the present application, when the darkening pattern has a destructive interference characteristic and an absorption coefficient characteristic that are the aforementioned physical properties, and when it is defined that the wavelength of light is $\lambda$, and the refractive index of the darkening pattern is n, as long as the thickness of the darkening pattern satisfies the thickness condition of $\lambda/(4 \times n) = N$ (herein, N is an odd number), any thickness of the darkening pattern may be used. However, during the manufacturing process, in consideration of an etching property with the conductive pattern, it is preferable that the thickness is selected from 10 nm to 400 nm, but the preferable thickness may be different according to the used material and manufacturing process, and the scope of the present application is not limited to the foregoing numerical range.

The darkening pattern may also be formed of a single layer, or may also be formed of a plurality of layers of two or more layers.

It is preferable that the darkening pattern has a color close to an achromatic color. However, the color does not need to be the achromatic color, and as long as the darkening pattern has low reflectance even though the darkening pattern has a color, the darkening pattern may be adopted. In this case, the achromatic color means a color exhibited when light that is incident to a surface of an object is not selectively absorbed but is evenly reflected and absorbed with respect to a wavelength of each component. In the present application, the darkening pattern may use a material having a standard deviation of total reflectance for each wavelength range of 50% or less in a visible ray region (400 nm to 800 nm) when the total reflectance is measured.

The material of the darkening pattern is a light absorbing material, and preferably, as long as a material is made of a metal, a metal oxide, a metal nitride, or a metal oxynitride having the aforementioned physical properties when the entire layer is formed, the material may be used without a particular limitation.

For example, the darkening pattern may be an oxide film, a nitride film, an oxide-nitride film, a carbide film, a metal film, or a combination thereof formed by using Ni, Mo, Ti, Cr, and the like under a deposition condition set by those skilled in the art.

As a particular example, the darkening pattern may include both Ni and Mo. The darkening pattern may further include 50 to 98 atom % of Ni and 2 to 50 atom % of Mo, and may further include 0.01 to 10 atom % of other metals, for example, such as Fe, Ta, and Ti. Herein, the darkening pattern, if necessary, may further include 0.01 to 30 atom % of nitrogen or 4 atom % or less of oxygen and carbon.

As another particular example, the darkening pattern may include a dielectric material selected from SiO, $SiO_2$, $MgF_2$, and $SiN_x$ (x is an integer of 1 or more) and a metal selected from Fe, Co, Ti, V, Al, Cu, Au, and Ag, and may further include an alloy of two or more kinds of metals selected from Fe, Co, Ti, V, Al, Cu, Au, and Ag. It is preferable that the dielectric material is distributed in an amount gradually decreased as external light goes away from an incident direction, and the metal and alloy components are distributed on the contrary. In this case, it is preferable that the content of the dielectric material is 20 to 50 wt % and the content of the metal is 50 wt % to 80 wt %. In the case where the darkening pattern further includes the alloy, it is preferable that the darkening pattern includes 10 to 30 wt % of the dielectric material, 50 to 80 wt % of the metal, and 5 to 40 wt % of the alloy.

As another particular example, the darkening pattern may be formed of a thin film including one or more of an alloy of nickel and vanadium, and an oxide, a nitride, and an oxynitride of nickel and vanadium. In this case, it is preferable that vanadium is contained in a content of 26 atom % to 52 atom %, and it is preferable that an atomic ratio of vanadium to nickel is 26/74 to 52/48.

As another particular example, the darkening pattern may include a transition layer in which two or more elements are included and a composition ratio of one element is increased by a maximum of about 20% per 100 angstrom according to an incident direction of external light. In this case, one element may be a metal element, such as chrome, tungsten, tantalum, titanium, iron, nickel or molybdenum, and an element other than the metal element may be oxygen, nitrogen or carbon.

As another particular example, the darkening pattern may include a first chrome oxide layer, a metal layer, a second chrome oxide layer, and a chrome mirror, and in this case, the darkening pattern may include a metal selected from tungsten, vanadium, iron, chrome, molybdenum, and niobium instead of chrome. The metal layer may have a thickness of 10 to 30 nm, the first chrome oxide layer may have a thickness of 35 to 41 nm, and the second chrome oxide layer may have a thickness of 37 to 42 nm.

As another particular example, a laminate structure of an alumina ($Al_2O_3$) layer, a chrome oxide ($Cr_2O_3$) layer, and a chrome (Cr) layer may be used as the darkening pattern. Herein, the alumina layer has improvement of a reflection characteristic and a light diffusion prevention characteristic, and the chrome oxide layer may improve a contrast characteristic by decreasing mirror surface reflectance.

In the present application, the darkening pattern is provided in the regions corresponding to the conductive patterns of the driving electrode unit, the sensing electrode unit, and the wiring electrode unit. Herein, the region corresponding to the conductive pattern means the region having the pattern having the same shape as that of the conductive pattern. However, a pattern scale of the darkening pattern does not need to be completely the same as that of the conductive pattern, and the case where a line width of the darkening pattern is smaller or larger than the line width of the conductive pattern is also included in the scope of the present application. For example, it is preferable that the darkening pattern has an area of 80 to 120% of an area in which the conductive pattern is provided.

The darkening pattern may have a pattern shape having the line width that is the same as or larger than the line width of the conductive pattern.

When the darkening pattern has a pattern shape having the line width that is larger than the line width of the conductive pattern, the darkening pattern may more greatly impart an effect that the darkening pattern blocks the conductive pattern during the observation by a user, so that there is an advantage in that the darkening pattern may efficiently block an effect caused by luster or reflection of the conductive pattern itself. However, even when the line width of the darkening pattern is the same as the line width of the conductive pattern, a target effect of the present application may be achieved. The line width of the darkening pattern may be larger than the line width of the conductive pattern by a value according to Equation 2 below.

$$T\text{con} \times \tangent \theta_3 \times 2 \qquad \text{[Equation 2]}$$

In Equation 2, Tcon is a thickness of the conductive pattern, and $\theta_3$ is an angle between light and a normal line with respect to the surface of the substrate when the light incident from a position, at which a vision of a user of the touch sensor is positioned, passes through corners of the conductive pattern and the darkening pattern.

$\theta_3$ is an angle obtained by changing an angle ($\theta_1$) between the vision of the user of the touch sensor and the substrate by a refractive index of the substrate and a refractive index of a medium of a region in which the darkening pattern and the conductive pattern are disposed, for example, an adhesive of the touch sensor according to the Snell's law.

For example, when it is assumed that an observer observes the laminate so that the value of $\theta_3$ is about 80° and the thickness of the conductive pattern is about 200 nm, it is preferable that the line width of the darkening pattern is larger than that of the conductive pattern by about 2.24 μm (200 nm×tan(80)×2) based on the lateral surface. However, as described above, even when the darkening pattern has the same line width as that of the conductive pattern, a target effect of the present application may be implemented.

According to one particular example of the present application, it is possible to improve a manufacturing process of a touch sensor to decrease manufacturing cost of a touch sensor, and improve lightness and thinness of the touch sensor.

According to the exemplary embodiment of the present application, it is possible to provide the touch sensor in the single surface one-sheet type, so that it is possible to minimize a thickness of the touch sensor, and all of the conductive patterns are formed on the single surface, so that the manufacturing method is easy. Further, the touch sensor is in the one sheet type, so that the present application has an advantage in that the lamination is not required compared to the related art in which the touch sensor is formed by using two or more sheets of substrates. Further, the driving electrode unit and the sensing electrode unit are present on the same surface, so that it is easy to install and attach a flexible printed circuit board (FPCB). Further, the touch sensor is in the one sheet type, so that light transmittance is excellent compared to the touch sensor in the two sheet type. Further, when a functional surface film is laminated on the surface of the touch sensor, a step is not large, so that there is an advantage in that bubbles are not generated.

According to one particular example of the present application, it is possible to improve a manufacturing process of a touch sensor to decrease manufacturing cost of the touch sensor, and improve lightness and thinness of the touch sensor.

The invention claimed is:

1. A touch sensor, comprising:
   a substrate; and
   a driving electrode unit, a sensing electrode unit, and a wiring electrode unit provided on the same surface of the substrate,
   wherein:
   the touch sensor includes a touch sensing region and a touch non-sensing region,
   each of the driving electrode unit, the sensing electrode unit, and the wiring electrode unit includes a conductive pattern including a shielding portion and an opening portion,
   the wiring electrode unit includes a first wiring electrode unit positioned in the touch sensing region of the touch sensor and a second wiring electrode unit positioned in the touch non-sensing region of the touch sensor, and the first wiring electrode unit includes one or two or more bundles of wires connecting the driving electrode unit or the sensing electrode unit to the second wiring electrode unit,
   the conductive pattern configuring the touch sensing region includes a form, in which n repeat unit patterns are repeated in a width direction of the touch sensing region,
   the second wiring electrode unit is provided in a touch non-sensing region provided to be adjacent to a lateral surface of an upper portion of the touch sensing region and a touch non-sensing region provided to be adjacent to a lateral surface of a lower portion of the touch sensing region, and a width D of the repeat unit pattern is expressed by Equation 1:

$$D=A/(n\times m) \qquad \text{[Equation 1]}$$

wherein A is a width of the touch sensing region, n is the number of repeat unit patterns, and m is a divisor of n.

2. The touch sensor of claim 1, wherein at least some of the bundles of the first wiring electrode unit are connected to the second wiring electrode unit provided in the touch non-sensing region provided to be adjacent to the lateral surface of the upper portion of the touch sensing region, and other bundles of the first wiring electrode unit are connected to the second wiring electrode unit provided in the touch non-sensing region provided to be adjacent to the lateral surface of the lower portion of the touch sensing region.

3. The touch sensor of claim 1, wherein the conductive patterns provided in the touch sensing region and the touch non-sensing region are symmetric to each other based on a horizontal straight axis bisecting the touch sensor.

4. A touch sensor, comprising:

a substrate; and a driving electrode unit, a sensing electrode unit, and a wiring electrode unit provided on the same surface of the substrate, wherein:

the touch sensor includes a touch sensing region and a touch non-sensing region, each of the driving electrode unit, the sensing electrode unit, and the wiring electrode unit includes a conductive pattern including a shielding portion and an opening portion, the wiring electrode unit includes a first wiring electrode unit positioned in the touch sensing region of the touch sensor and a second wiring electrode unit positioned in the touch non-sensing region of the touch sensor, and the first wiring electrode unit includes one or two or more bundles of wires connecting the driving electrode unit or the sensing electrode unit to the second wiring electrode unit, the conductive pattern configuring the touch sensing region includes a form, in which n repeat unit patterns are repeated in a width direction of the touch sensing region, the second wiring electrode unit is provided in a touch non-sensing region provided to be adjacent to a lateral surface of an upper portion of the touch sensing region and a touch non-sensing region provided to be adjacent to a lateral surface of a lower portion of the touch sensing region, the first wiring electrode unit includes one or two or more bundles of the wires connecting the driving electrode unit or the sensing electrode unit to the second wiring electrode unit, each of the wires is formed of a mesh pattern, and in the bundle including the maximum number of wires among the bundles, a width W of the bundle, the number n2 of wires included in the bundle, and a minimum value P among distances between center points of adjacent mesh structures sharing at least one side among the mesh patterns forming the wires satisfy Equation 2 :

$$\frac{W}{n2}\times\sqrt{2} \geq P. \qquad \text{[Equation 2]}$$

5. The touch sensor of claim 4, wherein the bundle is formed in a pattern shape, in which a closed figure having two first disconnection points is continuously disposed in a direction from one side of the substrate adjacent to an end of the second wiring electrode to the other side of the substrate facing the one side, a virtual straight line connecting the adjacent the first disconnection points of the continuously disposed closed figures with a shortest distance has one or more inflection points, an angle formed by the virtual straight line at the inflection point is 90° or more, and a pattern that is in contact with the virtual straight line electrically connects the driving electrode unit or the sensing electrode unit to the second wiring electrode unit.

6. The touch sensor of claim 4, wherein Equation 2 is expressed by Equation 3:

$$\frac{W}{n2} \geq P\times\cos\theta 1 \qquad \text{[Equation 3]}$$

where W is the width of the bundle, n2 is the number of wires included in the bundle, and P is a minimum value among distances between center points of adjacent mesh structures sharing at least one side among the mesh patterns forming the wires, and θ1 is a small value among the angles between a straight line continuing in a width direction of the bundle with a shortest distance and a straight line connecting the center points of the adjacent mesh structures sharing at least one side with a shortest distance.

7. The touch sensor of claim 4, wherein Equation 2 is expressed by Equation 4:

$$\frac{W}{n2} \geq P\times\cos\theta 2 \qquad \text{[Equation 4]}$$

where W is the width of the bundle, n2 is the number of wires included in the bundle, and P is a minimum value among distances between center points of adjacent mesh structures sharing at least one side among the mesh patterns forming the wires, and θ2 is a small value among the angles between a straight line in a vertical direction with respect to a virtual straight line connecting the first disconnection points with a shortest distance, and a straight line connecting the center points of the adjacent mesh structures sharing at least one side with the shortest distance.

8. The touch sensor of claim 5, wherein a part, which has the longest distance between the inflection points, in the virtual straight line is parallel to at least one side configuring the closed figure or forms an angle more than 0° and less than 90° .

9. The touch sensor of claim 1, wherein the conductive patterns of the driving electrode unit, the sensing electrode unit, and the wiring electrode unit are formed of regular polygonal mesh patterns, and the repeat unit pattern satisfies Equation 5:

$$0<A_s+A_{s1}<2A_L \qquad \text{[Equation 5]}$$

wherein:
A$_s$ is an area of one first polygon which is provided within the repeat unit pattern and includes any one vertical distal end of the repeat unit pattern,
A$_{S1}$ is an area of one second polygon which is provided within the repeat unit pattern and includes another vertical distal end of the repeat unit pattern,
A$_L$ is an area of the one regular polygon, and
the first polygon and the second polygon are provided so as to share the same horizontal axis of the repeat unit pattern.

10. The touch sensor of claim 9, wherein the repeat unit pattern satisfies Equation 6:

$$0<A_s+A_{s1}=A_L \quad \text{[Equation 6]}$$

wherein:
A$_s$ is an area of one first polygon which is provided within the repeat unit pattern and includes any one vertical distal end of the repeat unit pattern,
A$_{S1}$ is an area of one second polygon which is provided within the repeat unit pattern and includes another vertical distal end of the repeat unit pattern,
A$_L$ is an area of the one regular polygon, and
the first polygon and the second polygon are provided so as to share the same horizontal axis of the repeat unit pattern.

11. The touch sensor of claim 1, wherein the conductive pattern is formed of a conductive metal line.

12. The touch sensor of claim 5, wherein an average diameter of the first disconnection point is 13μm or less.

13. A touch sensor, comprising:
a substrate; and
a driving electrode unit, a sensing electrode unit, and a wiring electrode unit provided on the same surface of the substrate,
wherein:
the touch sensor includes a touch sensing region and a touch non-sensing region,
each of the driving electrode unit, the sensing electrode unit, and the wiring electrode unit includes a conductive pattern including a shielding portion and an opening portion,
the wiring electrode unit includes a first wiring electrode unit positioned in the touch sensing region of the touch sensor and a second wiring electrode unit positioned in the touch non-sensing region of the touch sensor, and
the first wiring electrode unit includes one or two or more bundles of wires connecting the driving electrode unit or the sensing electrode unit to the second wiring electrode unit,
the conductive pattern configuring the touch sensing region includes a form, in which n repeat unit patterns are repeated in a width direction of the touch sensing region,
the second wiring electrode unit is provided in a touch non-sensing region provided to be adjacent to a lateral surface of an upper portion of the touch sensing region and a touch non-sensing region provided to be adjacent to a lateral surface of a lower portion of the touch sensing region,
at least a part of the conductive patterns of the driving electrode unit and the sensing electrode unit includes a second disconnection point, and
an average diameter of the second disconnection point is 13μm or less.

14. The touch sensor of claim 13, wherein the driving electrode unit and the sensing electrode unit are formed of conductive metal lines, and
the second disconnection point is provided in a crossing point region, in which the conductive metal lines within the driving electrode unit or the sensing electrode unit cross each other.

15. The touch sensor of claim 1, wherein each of the conductive patterns of the driving electrode unit, the sensing electrode unit, and the wiring electrode unit independently includes a polygonal mesh pattern.

16. The touch sensor of claim 1, wherein a width of the bundle is "W", and based on an area of W ×W, an opening ratio deviation between predetermined regions of the touch sensor corresponding to the area of W ×W is within 10%.

17. The touch sensor of claim 1, wherein the driving electrode unit, the sensing electrode unit, and the wiring electrode unit are simultaneously formed by a one-time printing process.

18. The touch sensor of claim 1, wherein the touch sensor recognizes a touch input by using a mutual capacitance method.

19. A display apparatus comprising the touch sensor of claim 1.

* * * * *